United States Patent [19]
Ishida et al.

[11] Patent Number: 6,092,017
[45] Date of Patent: Jul. 18, 2000

[54] PARAMETER ESTIMATION APPARATUS

[75] Inventors: Akira Ishida, Sakai; Masuo Takigawa, Nara, both of Japan

[73] Assignee: Matsushita Electric Industrial Co., Ltd., Osaka, Japan

[21] Appl. No.: 09/146,613

[22] Filed: Sep. 3, 1998

[51] Int. Cl.[7] .............................. F02D 41/04; G06F 17/00; G06F 15/18

[52] U.S. Cl. ................................ 701/106; 706/2; 706/12; 706/32

[58] Field of Search .............................. 701/99, 100, 101, 701/102, 103, 104, 105, 106, 115; 706/2, 12, 14, 15, 16, 25, 26, 27, 29, 32, 41, 905

[56] References Cited

U.S. PATENT DOCUMENTS

| | | | |
|---|---|---|---|
| 5,410,477 | 4/1995 | Ishii et al. | 701/102 |
| 5,682,317 | 10/1997 | Keeler et al. | 701/101 |
| 5,687,082 | 11/1997 | Rizzoni | 701/102 |
| 5,943,663 | 8/1999 | Mouradian | 706/14 |
| 5,954,783 | 9/1999 | Yamaguchi et al. | 701/106 |

FOREIGN PATENT DOCUMENTS 8-291746  11/1996  Japan .

OTHER PUBLICATIONS

"Neural Network Control of Automotive Fuel–Injection Systems," by Michael Majors et al., IEEE Control Systems, Jun. 1994.

"Stability of Nonlinear Time–Delay Systems with Parameter Uncertainties with an Application to Neural Networks," by H. Ye et al., American Control Conf. Jun. 1995.

"Intelligent Control Using Θ–adaptive Neural Networks: A New Approach to Identification and Control of Nonlinear Systems," by A. Annaswamy et al., American Control Conference Jun. 1995.

Real–Time Predictive Control of Semiconductor Manufacturing Processes Using Neural Networks, by C.D. Himmel et al., American Control Conference Jun. 1995.

"A Feedforward Neural Network for the Automatic Control of a Four–Wheel–Steering Passenger Car," by S. Rezeka, American Control Conference Jun. 1995.

"A Direct Adaptive Neural Network Control for Unknown Nonlinear Systems and Its Application," by J. Noriega et al., American Control Conference Jun. 1995.

"Neural–Net Based Multi–Steps Nonlinear Adaptive Model Predictive Controller Design," by D. Wang et al., American Control Conference Jun. 1995.

"Real–Time Experiments in Neural Identification and Control of Disturbance," by S. Mistry et al., American Control Conference Jun. 1995.

"Identification of Nonlinear Processes with Deadtime by Recurrent Neural Networks," by Y. Cheng et al., American Control Conference Jun. 1995.

"Air to Fuel Ratio Control of Spark Ignition Engines Using Dynamic Sliding Mode Control and Gaussian Neural Network," by M. Won et al., American Control Conference Jun. 1995.

"A Neural Network Air–Fuel Ratio Estimator," by P. O'Reilly et al., Control '94, 21–24 Mar. 1994 Conference, pp. 165–172.

Primary Examiner—Willis R. Wolfe
Attorney, Agent, or Firm—Price, Gess & Ubell

[57] ABSTRACT

An output parameter estimation apparatus for estimating an output parameter from an input data set that is composed of a plurality of input parameters and that is obtained whenever sampling time series input data. In this output parameter estimation apparatus, a fuzzy inference rule is used to calculate a fitness degree of the input data set in one of a plurality of fields included in a space that is formed using at least one input parameter. According to the calculated fitness degree, introduction routes through which the input data set is to be inputted into a neural network are selected. The neural network is set in a connection condition corresponding to the field to which the input data set belongs, the connection condition having been determined in advance as a result of learning process. With this connection condition, the neural network estimates the output parameter from the input data set inputted through the selected introduction routes.

16 Claims, 26 Drawing Sheets

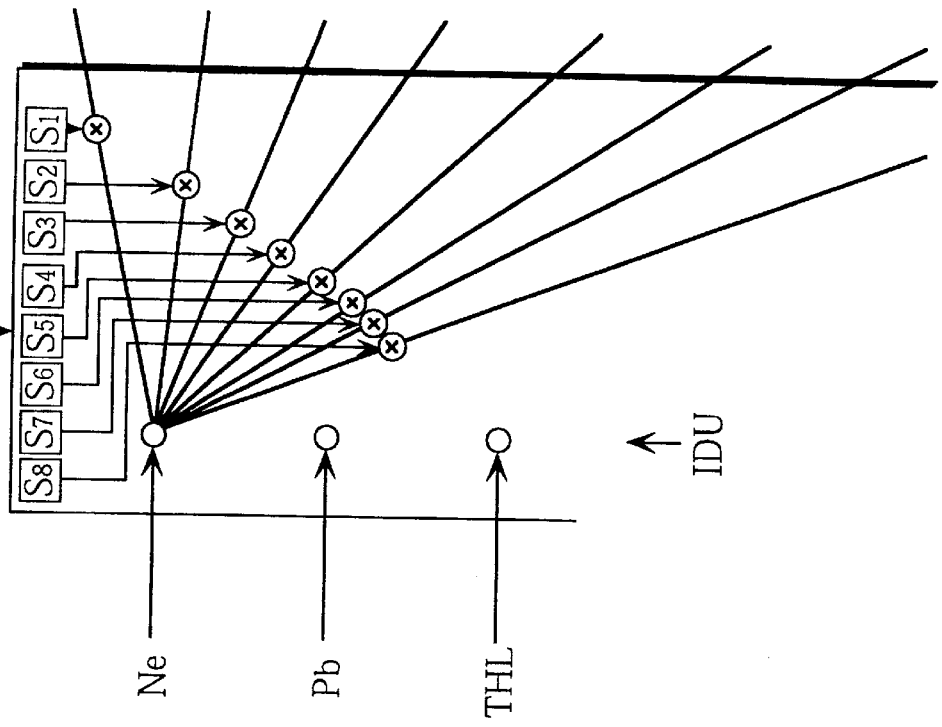
FIG. 6A FIELD DETERMINATION RESULT
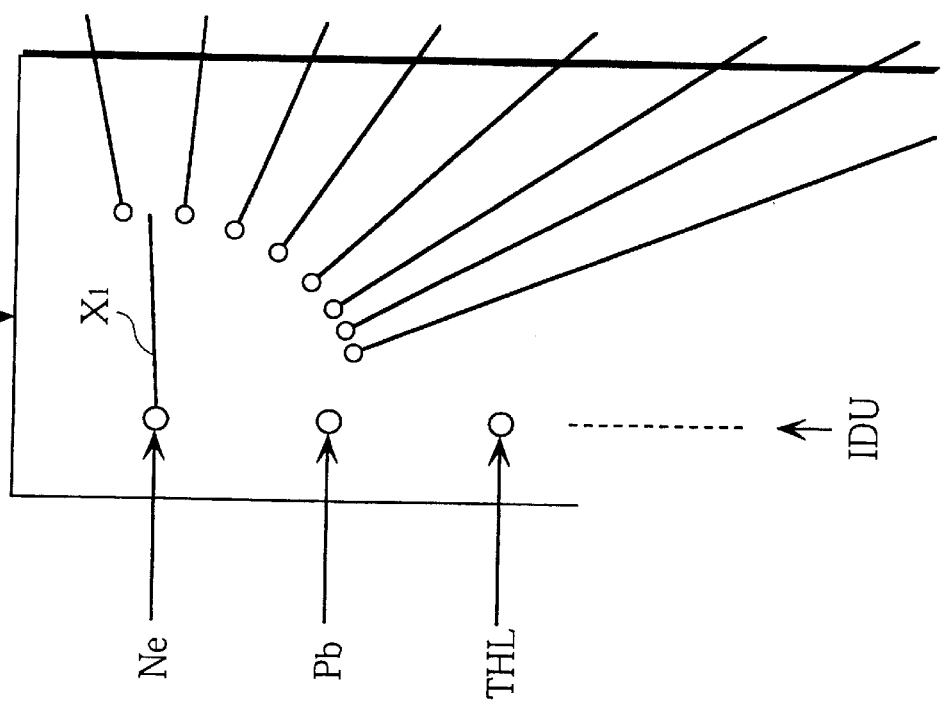
FIG. 6B FIELD DETERMINATION RESULT

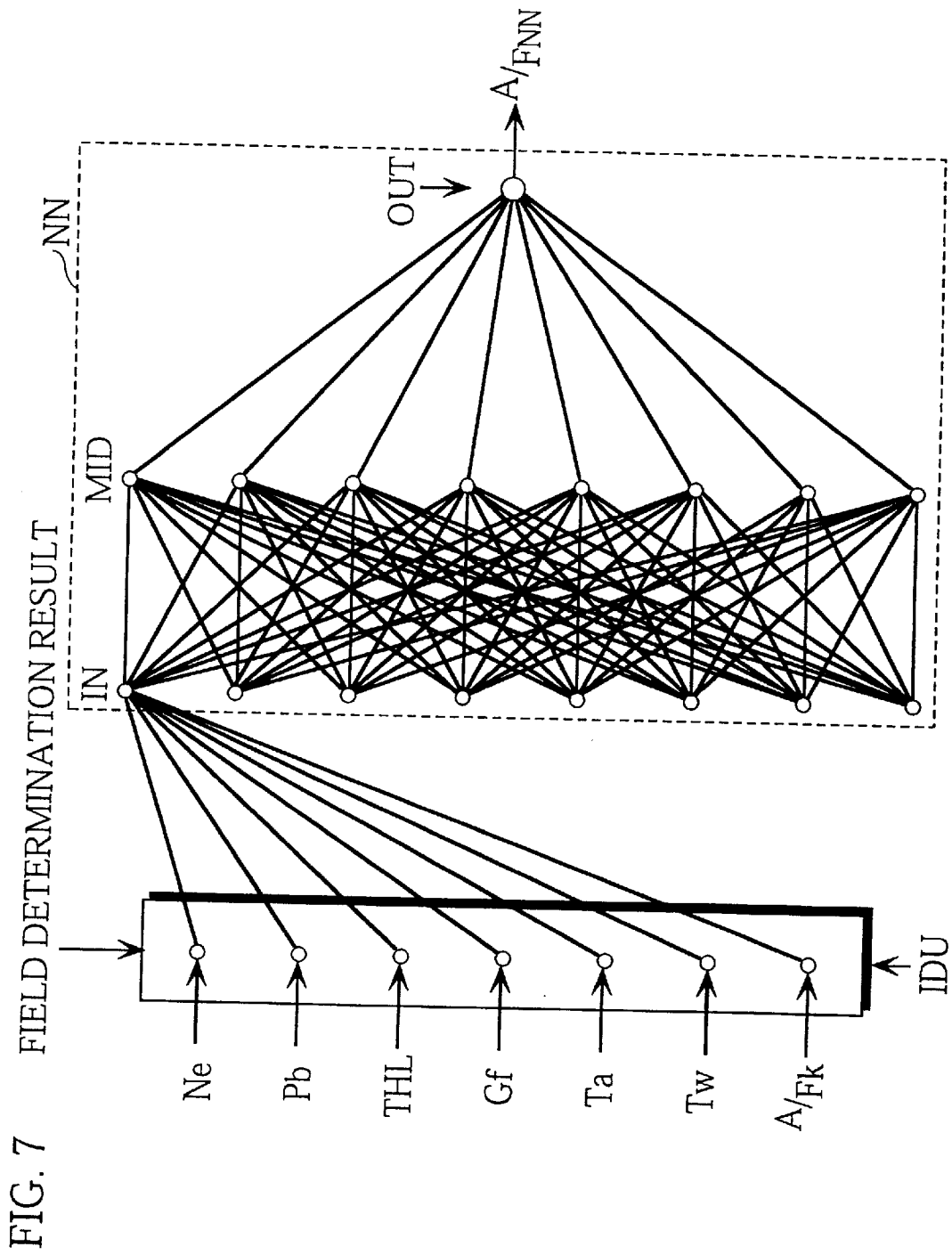

FIG. 11

| Pb\Ne | S | M | B |
|---|---|---|---|
| S | D1 | D2 | D3 |
| M | D4 | D5 | D6 |
| B | D7 | D8 | D9 |

PARAMETER ESTIMATION APPARATUS

This application is based on an application No. 9-238017 filed in Japan, the content of which is hereby incorporated by reference.

BACKGROUND OF THE INVENTION

1. Field of the Invention

The present invention relates to an output parameter estimation apparatus that uses a neural network, and more specifically relates to an output parameter estimation apparatus that is capable of learning according to various ranges of input parameters.

2. Description of the Prior Art

It is sometimes difficult to analyzes the input/output cause-effect relation in physical or chemical systems. However, outputs can be estimated from inputs based on learning functions of neural networks. Hence the neural networks have increasingly been used in control apparatuses for controlling complex systems, and especially for controlling targets that are extremely nonlinear. A representative of such apparatuses is air/fuel ratio control apparatuses for internal combustion engines in automobiles.

Many conventional cars have been fitted with catalytic converters to reduce the amount of pollutants, such as NOx, CO, and HC, present in exhaust fumes, with three-way catalytic converters being a representative example of such. Here, the air/fuel ratio must be kept at a fixed value that enables the most effective conversion of the pollutants by the three-way catalyst. For the above purpose, air/fuel ratio control that can keep the ratio at the fixed value with high accuracy regardless of the operational state of the engine is necessary.

Usually, such air/fuel ratio control performs feed-forward control when the driver adjusts the throttle to make compensated increases and decreases in the amount of injected fuel. It is also common for air/fuel ratio control to perform feedback control of a compensatory amount of injected fuel using readings given by an air/fuel ratio sensor. These control operations are especially effective under normal driving conditions, such as when the engine is idling or being driven at a constant speed. However, when the engine condition is in a transitional state, which here refers to acceleration or deceleration, the air/fuel ratio cannot be controlled accurately, since the detection delay of the air/fuel ratio sensor and the amount of injected fuel actually flowing into cylinders vary in a complex way with the driving conditions and the external environment. Thus, in reality it has been very difficult to accurately control the air/fuel ratio using only simple feed-forward and feedback control.

In order to improve the precision of such control, Japanese Laid-Open Patent Application 8-74636 discloses the use of a neural network to learn the nonlinear aspects, such as fuel coating caused by some of the injected fuel not flowing into the cylinders but sticking to the walls of the air intake pipe, and to calculate a fuel amount to be injected in order to increase the responsiveness of the control apparatus to changes in the operational state of the engine.

FIG. 25 shows an example of an air/fuel ratio control apparatus that uses a conventional neural network.

In this air/fuel ratio control apparatus, a state detection unit 210 detects physical values which shows the state of an engine E, such as the engine RPM (Ne), the intake air pressure (Pb), the present throttle amount (THL), the injected fuel amount (Gf), the intake air temperature (Ta), the cooling water temperature (Tw), and the air/fuel ratio (A/Fk) itself. These detected physical values are inputted into a neural network (NN) operation unit 220 which uses a neural network to estimate the actual air/fuel ratio (A/Fr) that cannot be accurately detected by the air/fuel ratio sensor when the engine condition is in a transitional state. An injected fuel amount calculation unit 230 then performs feedback control to minimize a deviation between the estimated air/fuel ratio (A/FNN) and the ideal air/fuel ratio (A/Fref) and calculates an injected fuel amount (Gb) that realizes the ideal air/fuel ratio Thus, precise air/fuel ratio control becomes possible by estimating the actual air/fuel ratio (A/Fr) for complex transitional engine conditions.

FIG. 26 shows the construction of the neural network used in the NN operation unit 220. This neural network is composed of three layers. Physical values of the engine RPM (Ne), the intake air pressure (Pb), the present throttle amount (THL), the injected fuel amount (Gf), the intake air temperature (Ta), the cooling water temperature (Tw), and the air/fuel ratio (A/Fk) detected by the state detection unit 210 are inputted in the first layer as input parameters. Here, though the air/fuel ratio (A/Fk) is the most recent air/fuel ratio detected by the air/fuel ratio sensor in control cycles, this ratio does not show the actual air/fuel ratio (A/Fr) that represents a combustion result of the current injected fuel, due to the time-delay of the air/fuel ratio sensor. The input parameters are each multiplied by each one of a plurality of weights, and the total of multiplication results corresponding to the input parameters is added to a threshold value and then converted according to a transfer function in each unit in the second layer. Here, "unit" means a basic component of the neural network that is set in each layer of the neural network. Each converted value is further multiplied by a corresponding weight and the multiplication results are totaled in the unit in the third layer. Another threshold value is added to the total and the addition result is converted according to another transfer function. As a result, the estimated air/fuel ratio (A/FNN) is obtained.

The learning process for the neural network used by the NN operation unit 220 is shown in FIG. 27. The figure shows a model example of the learning process for the neural network which obtains the estimated air/fuel ratio (A/FNN) with the engine RPM (Ne), the intake air pressure (Pb), the present throttle amount (THL), the injected fuel amount (Gf), the intake air temperature (Ta), the cooling water temperature (Tw), and the air/fuel ratio (A/Fk) as its input parameters (hereinafter, this set of input parameters is simply referred to as "input data set").

Here, a state detection unit 210 same as that shown in FIG. 25 is installed in the engine E to gather input data sets when driving a real car. The gathered input data sets are each converted to a learning data set by a learning data generation unit a in view of the detection delay of the air/fuel ratio sensor and the changes in operational characteristics of the engine. This learning data set is made up of an input data set and teaching data of air/fuel ratio (A/Ft). Here, the teaching data (air/fuel ratio (A/Ft)) matches the actual air/fuel ratio (A/Fr) and is generated from the detected air/fuel ratio (A/Fk) in view of the detection delay of the air/fuel ratio sensor. While it is preferable for previously obtained input data sets to also be included in the learning data sets and for the learning data sets to be used as time series data, the previous input data sets are not used in the present example for simplifying the explanation. The learning data sets are then stored in a learning data storage unit b and used by a learning execution unit c for the learning of the neural network. Here, each input data set is inputted in the neural network which detects the deviation e between the estimated air/fuel ratio (A/FNN) and the corresponding teaching data (A/Ft) as its output. The neural network then progressively changes its connection condition, including weights and threshold values, according to a back propagation method so that this deviation e falls within a permitted range, such as 0.1 on the air/fuel ratio scale.

This learning process for the neural network must be performed with high accuracy in order to improve the control accuracy of the conventional air/fuel ratio control apparatuses such as above.

For this aim, learning data sets are prepared so as to cover not just one specific state of the engine but various operational states of the engine. However, the learning data sets generated as such may still not be sufficient for accurately estimating the actual air/fuel ratio. Accordingly, it is necessary to repeat a development routine composed of judging the learning result, generating new learning data sets by gathering input data sets corresponding to a field where the learning result is judged as poor, and relearning using the new learning data sets. "Field" here refers to the operational state of the engine that is specified by a combination of ranges of at least two input parameters.

When the deviation e for one field is outside the permitted range, the amount of learning data sets for that field is increased and relearning is performed to reduce the deviation e. In such a case, the new learning data sets for the field have to be selected so as not to disturb the balance of the amount of learning data sets for each field. However, when the neural network executes the relearning using the newly generated learning data, there is a possibility that a field where the learning result is judged as satisfactory in the previous stage was judged as unsatisfactory in this relearning stage, or even the learning results of the neural network as a whole is degraded. When this happens, the selection of input data sets, the generation of new learning data sets, and the relearning must be repeated until the learning result for each field is judged as satisfactory. This requires a considerable amount of time. Thus, it is very difficult to improve the estimation accuracy of the air/fuel ratio of the neural network for various fields other than by depending on trial-and-error methods Also, it is impossible to cover all possible operational states of the engine in the learning process for the neural network at the time of production. Accordingly, the learning is performed by the above trial and error methods for predictable operational conditions so that the air/fuel ratio can be accurately controlled at least under those predictable conditions. However, when an operational condition which is not covered by the learning occurs, it is difficult to control the air/fuel ratio with high accuracy since the estimation accuracy of the neural network may decrease. A failsafe function is usually used for stopping the control when parameters which are beyond the range covered by the learning are inputted.

In the air/fuel ratio control apparatus described above, the learning range of the neural network corresponds to predictable driving states. When a driving state is outside the learning range, such as when driving the car in the mountains or when performance of the air/fuel ratio sensor deteriorates, it is difficult to keep the air/fuel ratio at the desired ratio.

Online learning adaptive neural networks have been suggested as a solution of the above problem. However, such conventional neural networks are only effective when repeating fixed operations but not always effective in air/fuel ratio control when performing various operations at random, since the estimation accuracy for a field that was judged as satisfactory in the previous learning stage may deteriorate in the relearning stage.

SUMMARY OF THE INVENTION

In view of the above problems, the first object of the present invention is to provide an output parameter estimation apparatus that can improve the poor estimation accuracy for some fields by performing relearning on the neural network, without affecting the estimation accuracy for the other fields.

The second object of the present invention is to provide an output parameter estimation apparatus that effectively maintains continuity of the connection condition of the neural network between each two adjacent fields.

The third object of the present invention is to provide an output parameter estimation apparatus that is advantageous for a control target that has a strong nonlinear characteristic, such as an engine, where an output needs to be estimated from a plurality of inputs. For instance, the fuel amount to be injected needs to be determined based on the air/fuel ratio in the engine. However, the sensor installed in the exhaust system of the engine cannot detect the actual air/fuel ratio due to its detection delay. Accordingly, the actual air/fuel ratio in the engine needs to be estimated from the detected air/fuel ratio.

The fourth object of the present invention is to provide an output parameter estimation apparatus that can perform online learning accurately and efficiently using an online learning adaptive neural network so that the poor estimation accuracy for some fields can be improved by perfoming the relearning on the neural network, without affecting the estimation accuracy for the other fields.

The first to third objects can be fulfilled by an output parameter estimation apparatus for estimating an output parameter value from an input data set that is composed of a plurality of input parameter values, wherein the input data set is obtained whenever time series input data is sampled, the output parameter estimation apparatus including: a field division information storage unit for storing field division information showing how an n-dimensional space is divided into a plurality of fields, "n" being an integer no less than 1, and the n-dimensional space having n axes that correspond to n input parameters; a field determination unit for determining a field, among the plurality of fields, to which the input data set belongs, according to the field division information; a fuzzy operation unit for calculating a fitness degree of the input data set in each of the determined field and a field adjacent to the determined field by using a fuzzy inference rule for n input parameter values, among the plurality of input parameter values, that correspond to the n input parameters in the n-dimensional space; a neural network, including an input layer, an output layer, and at least one hidden layer between the input layer and the output layer, the input layer, the hidden layer, and the output layer being connected according to a connection condition corresponding to each of the plurality of fields, the connection conditions having been set as a result of learning performed using learning data; a route selection unit for selecting routes between an introduction layer for the neural network and the input layer of the neural network, based on the fitness degrees obtained by the fuzzy operation unit; and an input data introduction unit for inputting, after the routes are selected by the route selection unit, the input data set into the input layer of the neural network via the introduction layer and the selected routes, wherein, after being inputted in the input layer, the input data set is transferred to the output layer via the hidden layer in the connection condition corresponding to the determined field, and as a result the estimated output parameter value is outputted from the output layer.

Here, the fuzzy operation unit may obtain the fitness degree of the input data set in each of the determined field and the adjacent field based on membership functions corresponding to each of the n input parameters, and obtain a centroid for the input data set according to the obtained fitness degrees, based on membership functions that show the determined field and the adjacent field.

Here, the fuzzy operation unit may obtain the centroid using a min-max calculation method.

Here, the route selection unit may select the routes between the introduction layer and the input layer in accordance with a proximity of the centroid to the adjacent field.

Here, the input data set may be composed of a plurality of physical parameter values that are detected in an engine, an intake system, and an exhaust system while the engine is being used, wherein the output parameter value is an air/fuel ratio that is estimated as an actual air/fuel ratio in the engine, the actual air/fuel ratio being unable to be detected by an air/fuel ratio sensor installed in the exhaust system, wherein the neural network is a hierarchical neural network where the plurality of physical parameter values are inputted in the input layer and the estimated air/fuel ratio is outputted from the output layer, and wherein the field division information storage unit stores information showing the plurality of fields that are generated by dividing each of at least two physical parameters that include an engine RPM and an intake air pressure into three ranges that are a low-speed range, a medium-speed range, and a high-speed range.

Here, the route selection unit may change weights respectively assigned to the routes between the introduction layer and the input layer according to a proximity of the centroid to the adjacent field.

Here, the input data set may be composed of a plurality of physical parameter values that are detected in an engine, an intake system, and an exhaust system while the engine is being used, wherein the output parameter value is an air/fuel ratio that is estimated as an actual air/fuel ratio in the engine, the actual air/fuel ratio being unable to be detected by an air/fuel ratio sensor installed in the exhaust system, wherein the neural network is a hierarchical neural network where the plurality of physical parameter values are inputted in the input layer and the estimated air/fuel ratio is outputted from the output layer, and wherein the field division information storage unit stores information showing the plurality of fields that are generated by dividing each of at least two physical parameters that include an engine RPM and an intake air pressure into three ranges that are a low-speed range, a medium-speed range, and a high-speed range.

The fourth object can be fulfilled by an output parameter estimation apparatus for estimating an output parameter value from an input data set that is composed of a plurality of input parameter values, wherein the input data set is obtained whenever time series input data is sampled, the output parameter estimation apparatus including: a field division information storage unit for storing field division information showing how an n-dimensional space is divided into a plurality of fields, "n" being an integer no less than 1, and the n-dimensional space having n axes that correspond to n input parameters; a field determination unit for determining a field, among the plurality of fields, to which the input data set belongs, according to the field division information; a neural network, including an input layer, an output layer, and at least one hidden layer between the input layer and the output layer, the input layer, the hidden layer, and the output layer being connected according to a connection condition corresponding to each of the plurality of fields, the connection conditions having been set as a result of learning performed using learning data sets; a route selection unit for selecting routes between an introduction layer for the neural network and the input layer of the neural network in accordance with the field determined by the field determination unit; an input data introduction unit for inputting, after the routes are selected by the route selection unit, the input data set into the input layer of the neural network via the introduction layer and the selected routes, wherein, after being inputted in the input layer, the input data set is transferred to the output layer via the hidden layer in the connection condition corresponding to the determined field, and as a result the estimated output parameter value is outputted from the output layer; an estimation accuracy judgement unit for comparing, each time an input data set obtained by sampling the time series input data is inputted in the input layer by the input data introduction unit, an estimated output parameter value outputted from the output layer with a base value corresponding to the estimated output parameter value in order to judge an estimation accuracy of the neural network in a connection condition corresponding to each field; a first relearning unit for performing learning, when the estimation accuracy is judged as poor for at least one field, on a connection condition of the neural network corresponding to the field using learning data sets in order to obtain a new connection condition, each learning data set being composed of an input data set that belongs to the field and a base value corresponding to the input data set, and the learning being performed after the introduction layer and the input layer are connected by the routes selected by the route selection unit; and a neural network renewal unit for renewing the connection condition of the neural network corresponding to the field based on the new connection condition.

Here, the estimation accuracy judgement unit may include a base value acquisition unit for acquiring an accurately estimated output parameter value as the base value corresponding to the input data set from outside.

Here, the estimation accuracy judgement unit may judge the estimation accuracy for each field by calculating one of an average value and a distribution value for a plurality of difference values obtained within an estimation accuracy judgement period, the plurality of difference values each being a difference between an output parameter value and a corresponding base value.

Here, the estimation accuracy judgement unit may judge the estimation accuracy for each field by calculating a total value for a plurality of difference values obtained within an estimation accuracy judgement period, the plurality of difference values each being a difference between an output parameter value and a corresponding base value.

Here, the first relearning unit may include: a learning data generation unit for generating each of the learning data sets from the input data set that belongs to the field and the corresponding base value; a learning data storage unit for storing the generated learning data sets corresponding to the field; and a learning execution unit for performing the learning on the connection condition of the neural network corresponding to the field using the stored learning data sets to obtain the new connection condition.

Here, the output parameter estimation apparatus may further include: an initial connection condition storage unit for storing an initial connection condition of the neural network for each field; and an initial connection condition return unit for returning the neural network to the initial connection condition stored in the initial connection condition storage unit.

Here, the output parameter estimation apparatus may further include: a generalization ability judgement unit for comparing, after the connection condition of the neural network is renewed by the neural network renewal unit, output parameter values, which are estimated by the neural network respectively from input data sets that belong to the field, with corresponding base values to judge a generalization ability of the neural network in the new connection condition; and a renewal cancel unit for canceling, when the generalization ability is judged as poor, the new connection condition of the neural network corresponding to the field.

Here, the output parameter estimation apparatus may further include: a generalization ability judgement unit for comparing, after the connection condition of the neural network is renewed by the neural network renewal unit, output parameter values, which are estimated by the neural network respectively from input data sets that belong to the field, with corresponding base values to judge a generalization ability of the neural network in the new connection condition; and a second relearning unit for generating, when the generalization ability is judged as poor, learning data sets using input data sets that belong to the field and corresponding base values, and for performing relearning on the new connection condition of the neural network corresponding to the field in order to obtain a newer connection condition, wherein when the newer connection condition is obtained by the second relearning unit, the neural network renewal unit further renews the new connection condition of the neural network corresponding to the field based on the newer connection condition.

Here, the output parameter estimation apparatus may further include a provisional generalization ability judgement unit for obtaining a provisional neural network by provisionally renewing the connection condition of the neural network corresponding to the field based on the new connection condition obtained by the first relearning unit, and for comparing output parameter values, which are estimated by the provisional neural network from input data sets that belong to the field, with corresponding base values to judge a generalization ability of the provisional neural network in the new connection condition, wherein when the generalization ability of the provisional neural network is judged as satisfactory, the neural network renewal unit renews the connection condition of the neural network corresponding to the field based on the new connection condition obtained by the first relearning unit.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 6A shows a model example of a part of the route change pattern;

FIG. 6B shows a model example of a part of the weight change pattern;

FIG. 7 shows an example of the route construction after routes between the introduction layer IDU and the input layer IN are selected;

FIG. 11 shows an field division example to which the fuzzy inference rule is applied;

DESCRIPTION OF THE PREFERRED EMBODIMENTS

The following is an explanation of the embodiments of the present invention with reference to the Figures.

First Embodiment

Figure 1:
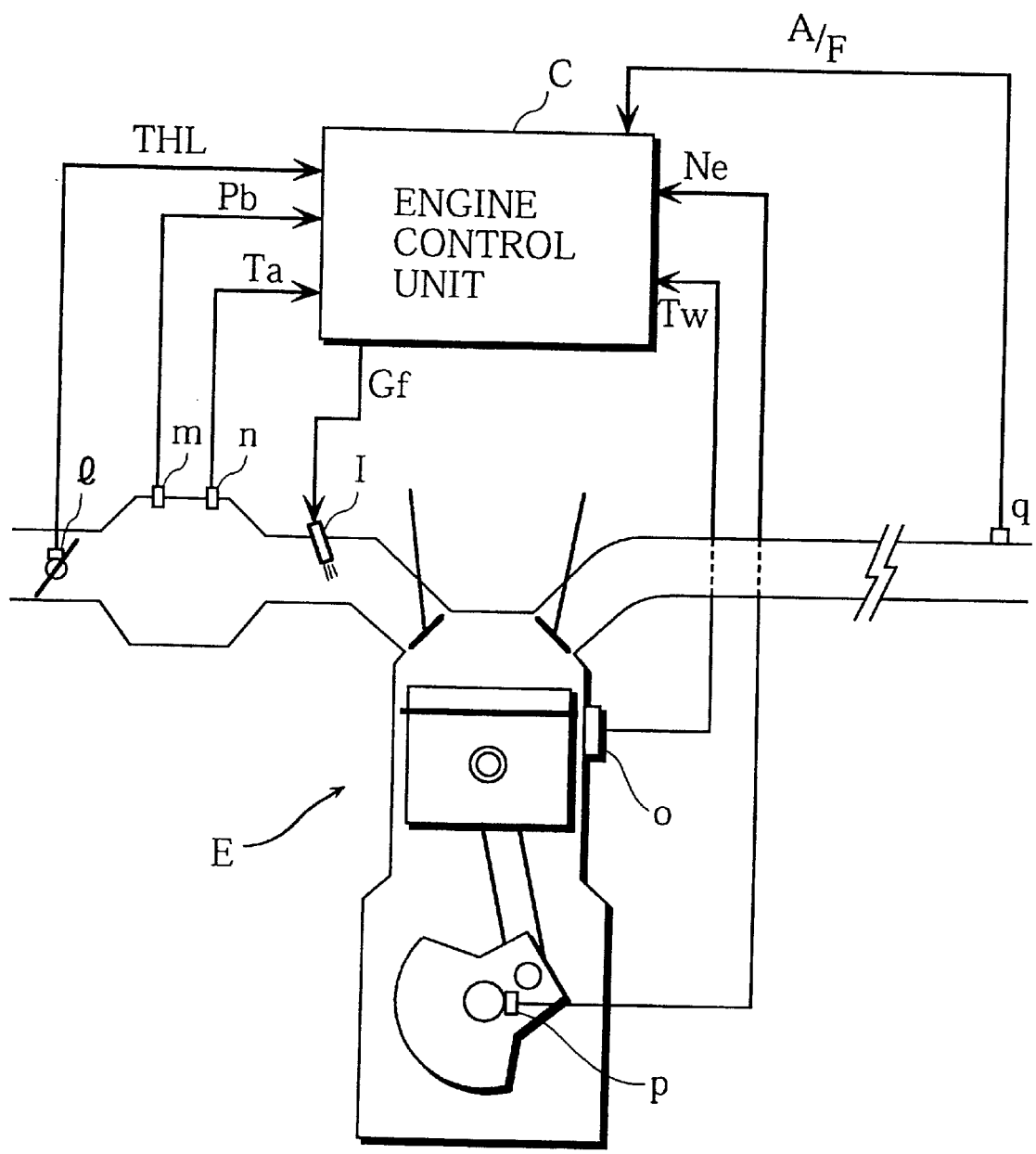
FIG. 1 shows a model example of the air/fuel ratio control apparatus of the embodiments of the present invention.

FIG. 1 shows a model example of the air/fuel ratio control apparatus that includes the output parameter estimation apparatus of the present invention As shown in the figure, the outputs of a throttle sensor 1, an intake air pressure sensor m, an intake air temperature sensor n, a cooling water temperature sensor o, a crank RPM sensor p, and an air/fuel ratio sensor q are inputted into an engine control unit C which then calculates an injected fuel amount (Gf) which keeps the actual air/fuel ratio (A/Fr) at the ideal air/fuel ratio (A/Fref). The engine control unit C outputs this calculated injected fuel amount (Gf) to an injector I which injects the indicated amount of fuel into an engine E. As a result, the air/fuel ratio can be kept at the ideal air/fuel ratio (A/Fref). Note here that the output of the air/fuel ratio sensor q is not used when the engine is cold.

<Engine Control Unit>

Figure 2:
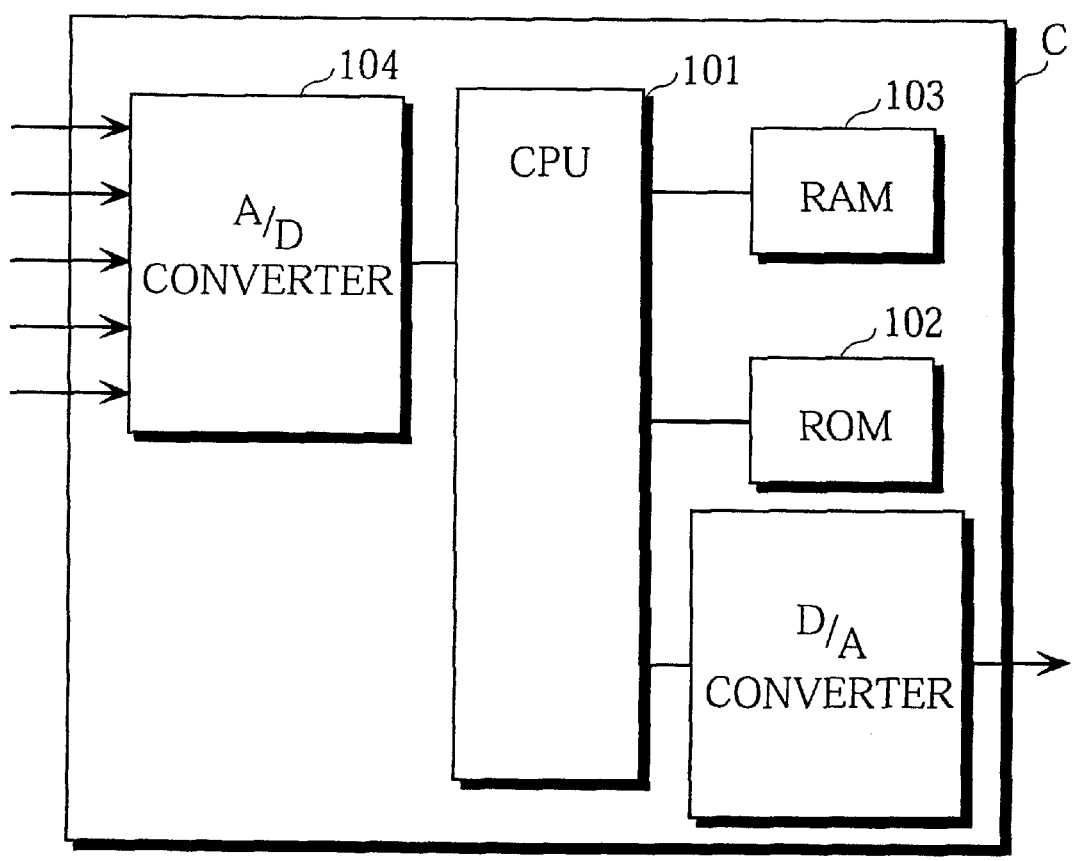
FIG. 2 shows the hardware construction of the engine control unit C.

The hardware construction of the engine control unit C is shown in FIG. 2. In the figure, the engine control unit C is composed of a CPU 101 for performing calculations, a ROM 102 which stores such information as a control program, various maps, weights for the neural network, threshold values, and transfer functions, a RAM 103 which is used to store calculated values, an A/D converter 104 for converting sensor inputs to digital inputs, and a D/A converter 104 for converting digital outputs to analog outputs.

Figure 3:
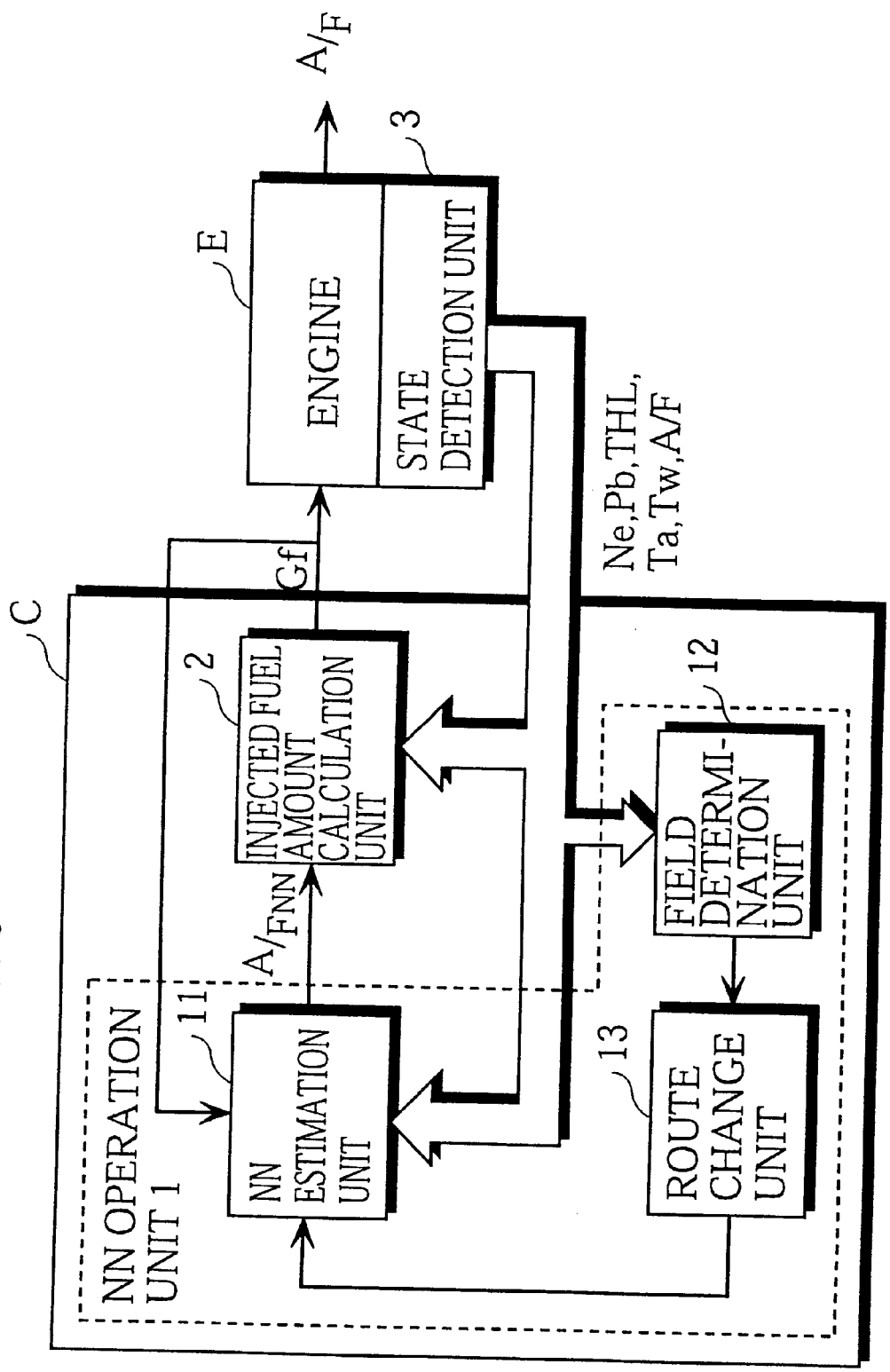
FIG. 3 is a functional block diagram for the air/fuel ratio control apparatus of the first embodiment.

FIG. 3 is a functional block diagram for the air/fuel ratio control apparatus that includes the engine control unit C which is achieved by the hardware construction of FIG. 2. This air/fuel ratio control apparatus is mainly composed of the engine control unit C and a state detection unit 3 for detecting physical values which shows the state of the engine E that is the control target. The engine control unit C includes a NN (neural network) operation unit 1 and an injected fuel amount calculation unit 2. The output parameter estimation apparatus of the present invention corresponds to the NN operation unit 1.

<State Detection Unit>

The state detection unit 3 detects a variety of detectable physical parameters which show the state of the engine E. The physical parameters which are detected here are the engine RPM (Ne), the intake air pressure (Pb), the present throttle amount (THL), the injected fuel amount (Gf), the intake air temperature (Ta), the cooling water temperature (Tw), and the air/fuel ratio (A/Fk) as the outputs of the above sensors. The state detection unit 10 is mainly composed of the sensors for the above parameters, a CPU which performs certain calculations on the physical values detected by the sensors, and a RAM which stores the injected fuel amount and other parameters in the previous control cycles. The injected fuel amount (Gf) detected here is an injected fuel amount of the control cycle immediately preceding an injected fuel amount that is stored into the RAM and that is to be injected into the engine E. Note here that the air/fuel ratio (A/Fk) detected by the air/fuel ratio q does not show the actual air/fuel ratio (A/Fr) corresponding to the current injected fuel amount, due to the detection delay of the air/fuel ratio sensor q. Note also that the present invention is not limited to using the parameters listed above, and so may also detect other physical parameters.

<NN Operation Unit>

The NN operation unit 1 is composed of a NN estimation unit 111, a field determination unit 12, and a route change unit 13. The NN estimation unit 11 receives the physical values detected by the state detecting unit 3 as an input data set and estimates the air/fuel ratio (A/FNN) using the neural network.

<NN Estimation Unit>

Figure 4:
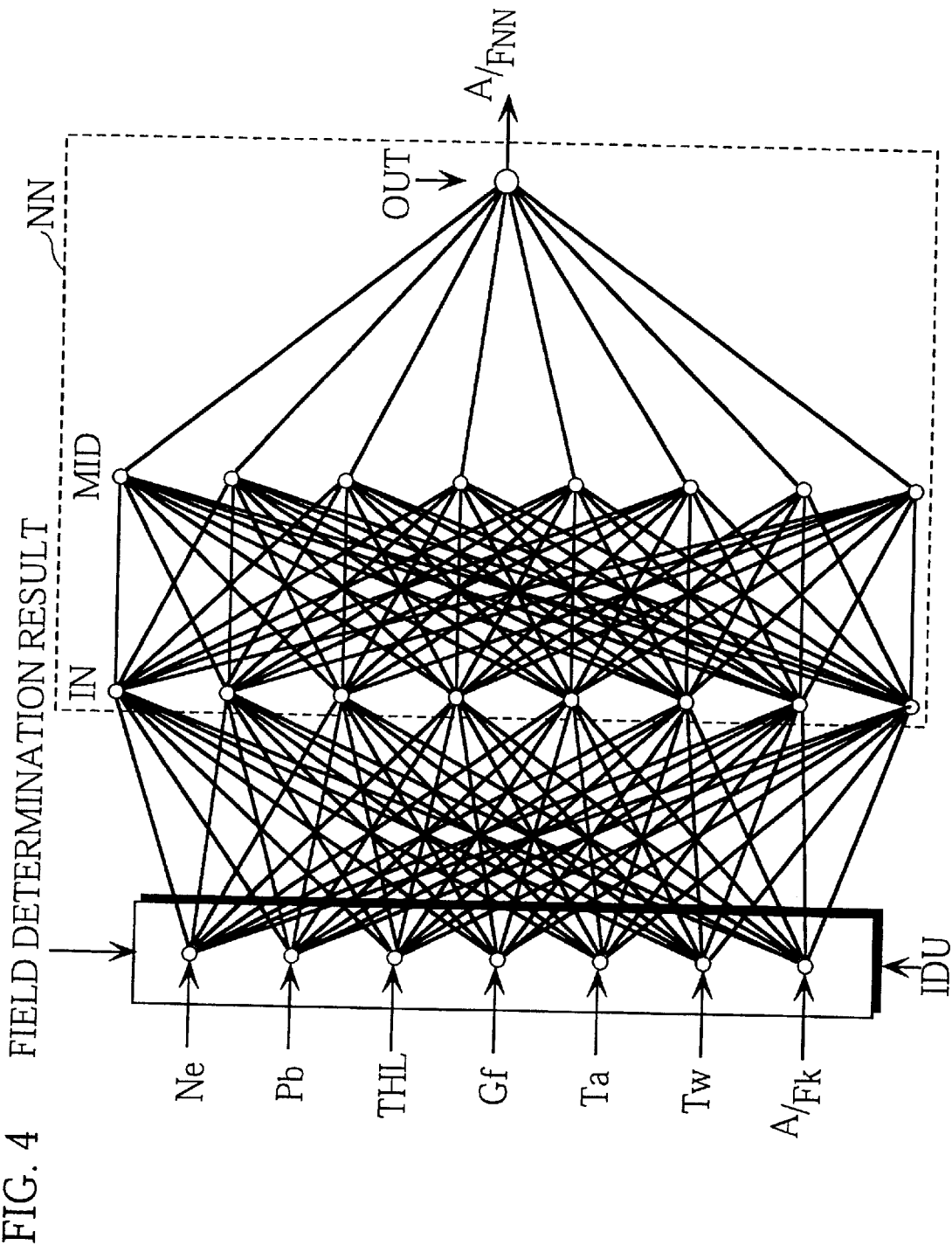
FIG. 4 shows the construction of the neural network of the embodiments.

FIG. 4 shows the construction of the neural network used in the NN estimation unit 11. The part encircled by the dashed line in the figure represents the neural network NN which is composed of three layers that are an input layer IN, a medium layer MID, and an output layer OUT. An introduction layer IDU is set in front of the neural network NN. The physical values of the engine RPM (Ne), the intake air pressure (Pb), the present throttle amount (THL), the injected fuel amount (Gf), the intake air temperature (Ta), the cooling water temperature (Tw), and the detected air/fuel ratio (A/Fk) are inputted in the introduction layer IDU as an input data set. Each unit (IDU unit) in the introduction layer IDU is connected to each one of the units (IN unit) in the input layer IN in the neural network NN via a separate route. Unlike the routes located within the neural network NN, an on/off state of each of the routes between the introduction layer IDU and the input layer IN is controlled by the route change unit 13. By doing so, each parameter is outputted from the introduction layer IDU to the input layer IN via a selected route. Note that among the above parameters, the air/fuel ratio (A/Fk) is "0" since the air/fuel ratio sensor q does not operate when the engine E is cold.

Each parameter inputted in the input layer IN of the neural network NN is multiplied by a weight expressed by a coupling coefficient, and the multiplication results are totaled in each unit (MID unit) in the medium layer MID. A threshold value is then added to the total and the addition result is converted according to a transfer function in each MID unit. Each conversion result is multiplied by a weight and the multiplication results are totaled in the unit (OUT unit) in the output layer OUT. Another threshold value is added to the total and the addition result is converted according to another transfer function. As a result, the estimated air/fuel ratio (A/FNN) is obtained. Thus, the neural network of the present invention estimates the air/fuel ratio (A/FNN) in the route construction that changes according to the field to which the input data set belongs. This characteristic of the neural network relates to the learning process for the neural network and is explained along with the learning process later.

<Field Determination Unit>

The field determination unit 12 determines a field that corresponds to the state of the engine E shown by the input data set. In the present embodiment, the engine RPM (Ne), the intake air pressure (Pb), the intake air temperature (Ta), and the cooling water temperature (Tw) are used for determining the field. These four parameters are selected since they exhibits greater nonlinear tendency in relation to the air/fuel ratio than the other parameters. The field determination unit 12 determines the field to which the input data set belongs in the four-dimensional space that is composed of the four parameters and that is divided into the plurality of fields.

Figure 5:
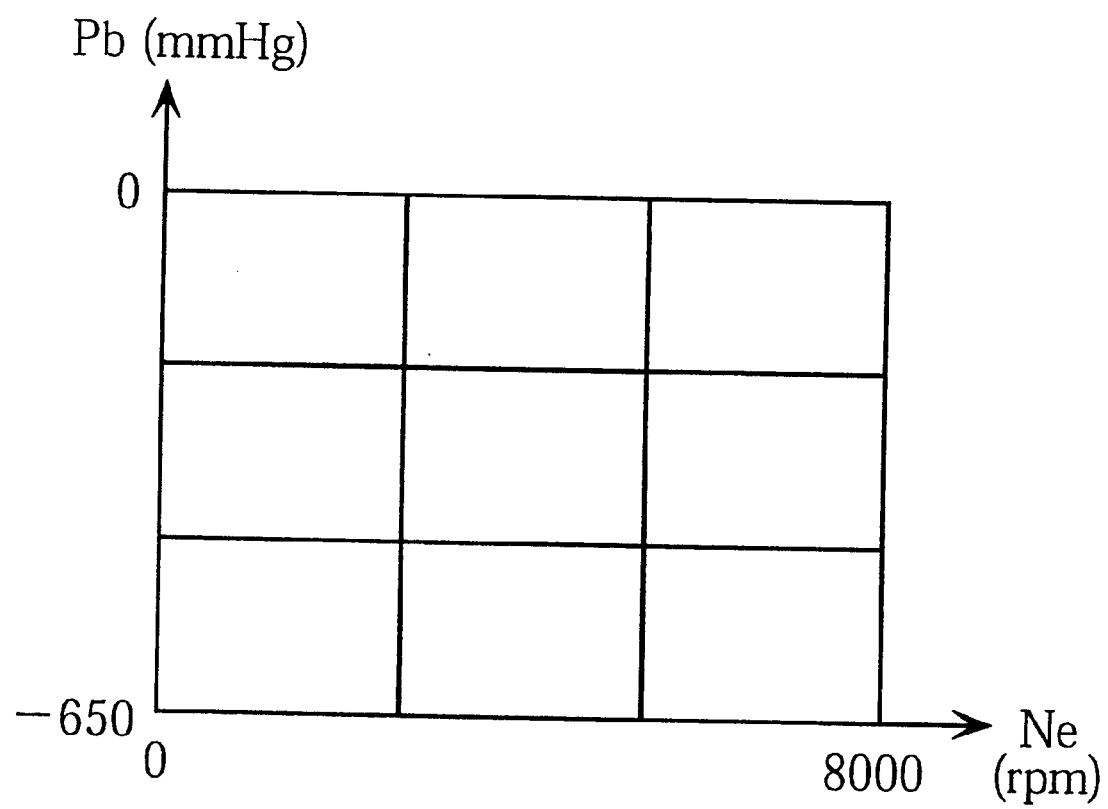
FIG. 5 shows a field division example.

The fields cannot be illustrated since they are set in the four-dimensional space. However, if only two parameters that are the engine RPM (Ne) and the intake air pressure (Pb) are used, for instance, fields are set as shown in FIG. 5. In the figure, the engine RPM (Ne) and the intake air pressure (Pb) are each divided into three ranges and as a result nine fields are generated. Here, the three ranges of each parameter correspond to the driving patterns that are roughly classified as: idling/low-speed driving; medium-speed driving; and high-speed driving. Note that the field division pattern should be flexibly determined according to characteristics and conditions of the control target. Also, the number of dimension of the space is determined by the number of parameters used for field division. Accordingly, when using a single parameter, the space is a one-dimensional space, that is, a straight line, and this straight line is divided into fields.

<Route Change Unit>

The route change unit 13 changes the route construction between the introduction layer IDU and the input layer IN of the neural network NN according to the field determined by the field determination unit 12. For example, each field in the four-dimensional space may be associated with one or more routes that connect each IDU unit to one or more specified IN units. Alternatively, the route change unit 13 may change a weight of each route according to the field.

The correspondence between a field and a route construction is not definite, such as a specific set of routes being always associated with one field. Rather, when the input data set belongs to one field but is close to an adjacent field, routes associated with the adjacent field may also be used. This fuzziness in control is explained in detail later.

FIG. 6 shows model examples of the basic route changes between the introduction layer IDU and the input layer IN of the neural network NN. FIG. 6A shows an example of the route change when the route change unit 13 selects one of a plurality of routes for the IDU unit whose input is the engine RPM (Ne). A switch X1 is switched according to the field determination result and one route is selected. The other IDU units are constructed in the same way. The actual route change is performed under the control of the control program stored in the ROM 102 in the engine control unit C.

As the route selection pattern, one extreme example is that each switch for the IDU units selects a route that leads to the same IN unit, such as when one field is associated with each route that leads to the top IN unit in the input layer IN, and another field is associated with each route that leads to the second top IN unit in the input layer IN. FIG. 7 shows the route construction when each switch selects a route that lead to the top IN unit. In such a route construction, data is exclusively outputted from the top IN unit to the medium layer MID. This concentration of the outputs can be eased by changing the weight of each route that leads to the medium layer MID. However, the example shown in FIG. 7 is an extreme case for the route selection pattern. Rather, the selection pattern in which each switch for the IDU units selects a plurality of routes that lead to the same IN units according to a field to which an input data set belongs is more useful in the air/fuel ratio control.

FIG. 6B shows another example of the route change pattern when the route change unit 13 changes a weight of each route for the IDU unit whose input is the engine RPM (Ne). Weights (S1–S8) of the eight routes shown in the figure are changed according to the field determination result, and data in each route is multiplied by the corresponding weight.

While just one IN unit is used as a result of the route selection in FIG. 7, in FIG. 6B all IN units are used by assigning the largest weight to each route that leads to a main IN unit and smaller weights to routes that lead to the other, secondary IN units. Also, the route construction can be increased in variety by changing weights in various ways, so that the route construction can flexibly correspond to a plurality of fields.

Figure 8:
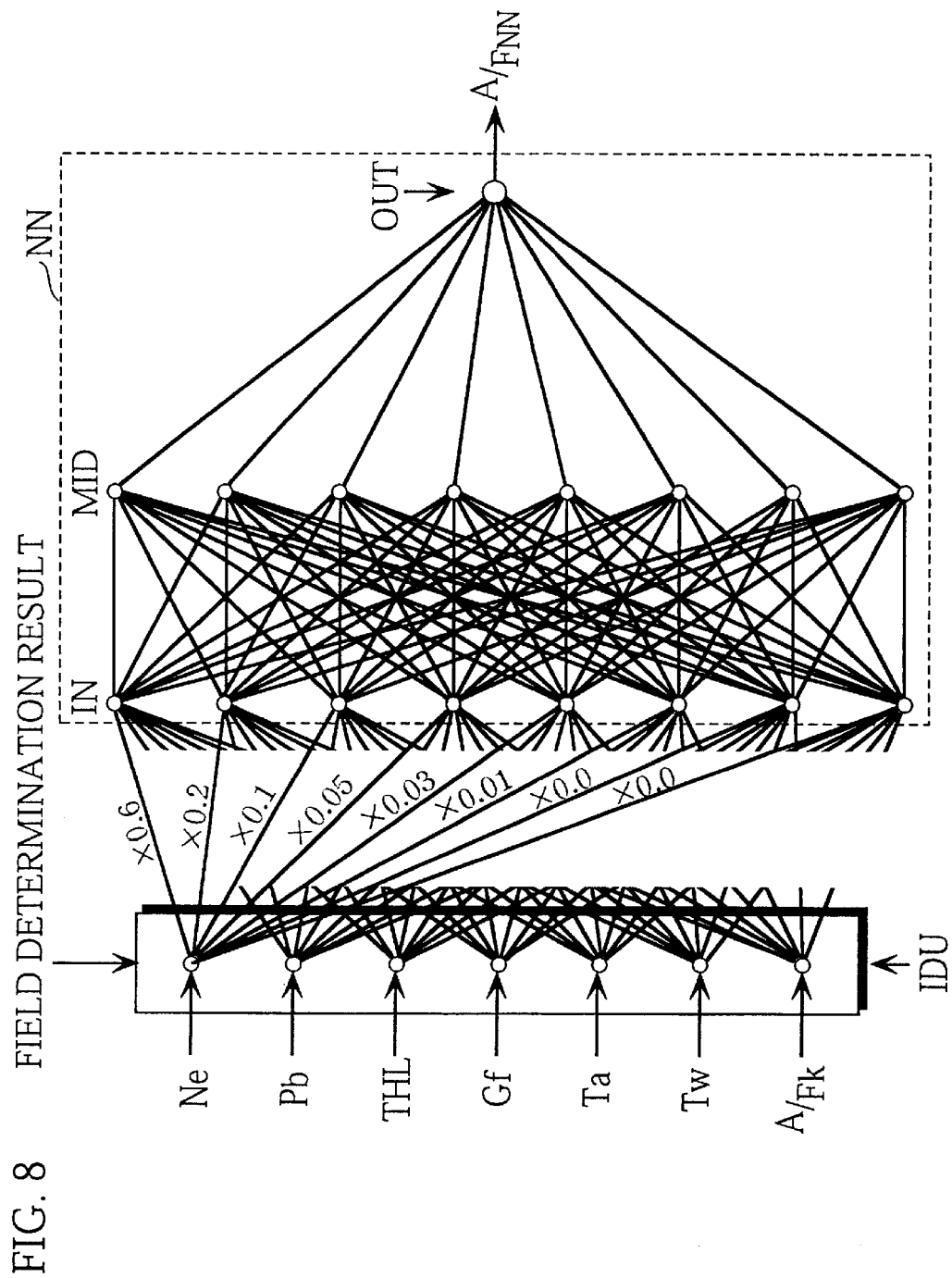
FIG. 8 shows an example of the route construction after weights of the routes between the introduction layer IDU and the input layer IN are changed.

FIG. 8 shows an example of assigning a weight to each route that connects the IDU unit whose input is the engine RPM (Ne) to the input layer IN. Here, the same weight assignment is applied for the other IDU units. By doing so, the top IN unit is made as the main unit by assigning the weight "0.6" to each route that leads to the top IN unit, while the other IN units can be made as the secondary units by assigning smaller weights to the routes that lead to these IN units. The main unit varies according to a field determined by the field determination unit 12, so do the weights assigned to the secondary units. Thus, a variety of route constructions can be used.

<Injected Fuel Amount Calculation Unit>

The injected fuel amount calculation unit 2 in the engine control unit C calculates the injected fuel amount (Gf) from the deviation e between the air/fuel ratio (A/FNN) estimated in the NN operation unit 1 and the ideal air/fuel ratio (A/Fref (=14.7)). More specifically, the injected fuel amount (Gf) is calculated according to an equation that has been given as the P control system, the PI control system, or the PID control system using the deviation e. For instance, the following equation is used. Note here that "Kp", "Kd", "Ki" are PID gains and are obtained in desk calculations and experiments.

$$Gf = Kp \cdot e + Kd \cdot \Delta e + Ki \cdot \Sigma e$$

While the injected fuel amount (Gf) is directly calculated from the deviation e between the estimated air/fuel ratio (A/FNN) and the ideal air/fuel ratio (A/Fref) in the present example, the following method may instead be used. The physical values detected by the state detection unit 3 are inputted in the injected fuel amount calculation unit 2 which calculates the base injected fuel amount (Gfb) from the inputted values by feed-forward control using maps obtained in the experiments. Meanwhile, the injected fuel amount calculation unit 3 also calculates the compensatory amount (ΔGf) for the injected fuel amount according to the equation given as the PID control system so as to minimize the deviation e between the estimated air/fuel ratio (A/FNN) and the ideal air/fuel ratio (A/Fref). The injected fuel amount calculation unit 3 then adds the compensatory amount (ΔGf) to the base injected fuel amount (Gfb) to obtain the injected fuel amount (Gf). According to this method, even when large noise occurs in the neural network NN and as a result the estimation accuracy of the neural network NN is badly affected, injection of the abnormal amount of fuel can be avoided.

<Learning Process>

The following is an explanation of the learning process of the neural network NN in the NN estimation unit 11 with the above construction.

Figure 9:
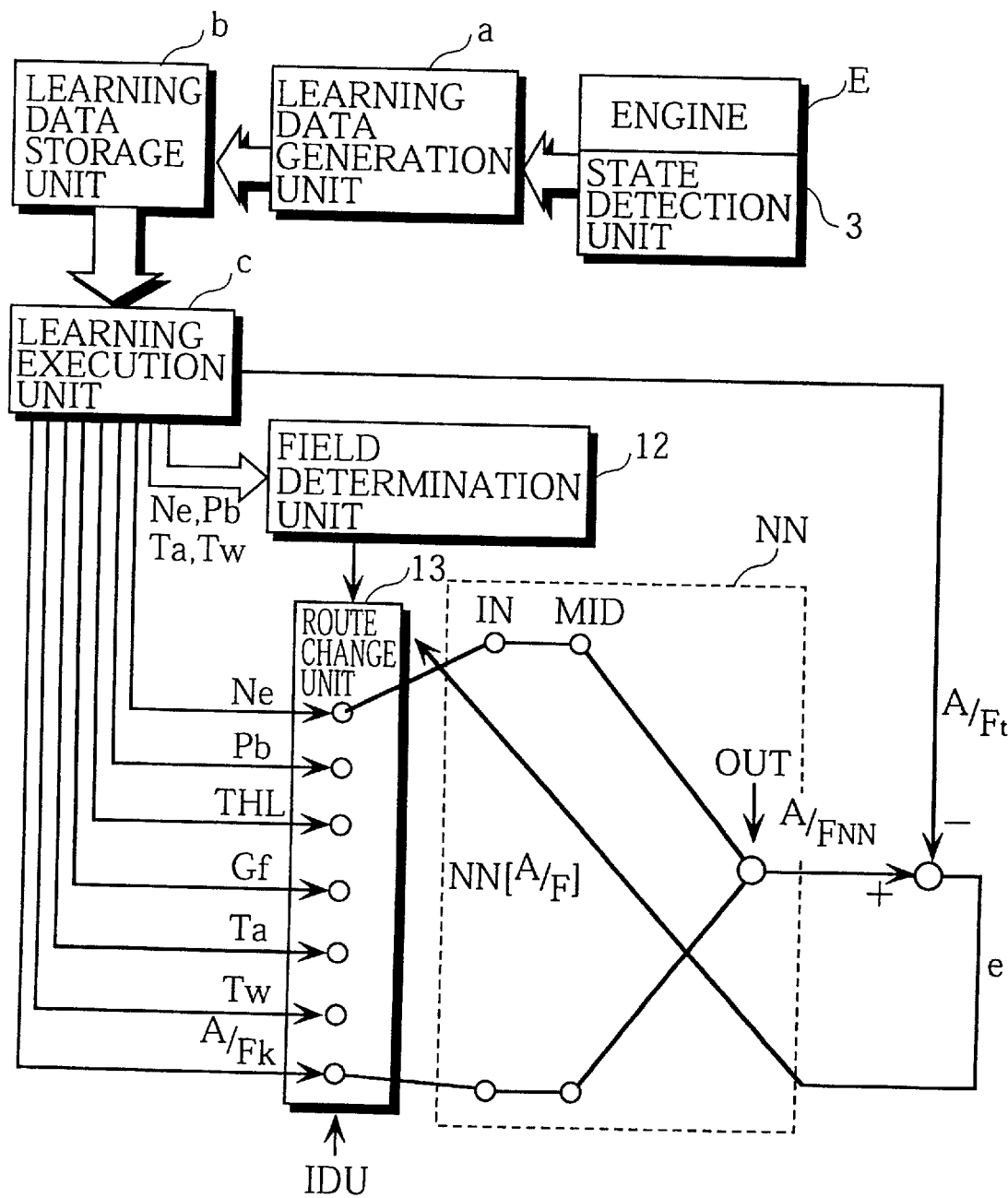
FIG. 9 shows a model example of the learning process for the neural network of the first embodiment.

FIG. 9 shows a model example for the learning process of the neural network NN that estimates the air/fuel ratio (A/FNN) from an input data set.

Here, a state detection unit 3 same as that shown in FIG. 3 is installed in the engine E to gather input data when driving a real car. Sampling is performed on the gathered input data. Here, data per sampling is referred to as "data set". Note that the air/fuel ratio sensor q in the state detection unit 3 is inactive when the engine is in low temperatures. Accordingly, when sapling, the air/fuel ratio sensor q needs to be warmed up even though the engine E itself is cold, so that the air/fuel ratio can be detected.

A learning data generation unit a performs phase delay compensation on each input data set in view of the detection delay of the air/fuel ratio sensor q. As a result, each input data set is stored in a learning data storage unit b along with corresponding teaching data (air/fuel ratio (A/Ft)) as a learning data set. Note that when driving the real car, the air/fuel ratio (A/Fk) detected when the engine E is cold is not inputted and so is not included in the input data set.

A learning execution unit c executes learning using the learning data sets. Here, each input data set is inputted via the introduction layer IDU into the neural network NN which detects the deviation e between the estimated air/fuel ratio (A/FNN) and the teaching data (air/fuel ratio (A/Ft)) as its output. The neural network then progressively changes its connection condition between the input layer IN and the medium layer MID and between the medium layer MID and the output layer OUT to minimize the deviation e.

Before inputting an input data set in the neural network NN, the engine RPM (Ne), the intake air pressure (Pb), the intake air temperature (Ta), and the cooling water temperature (Tw) included in the input data set are inputted in a field determination unit 12 same as that shown in FIG. 3 in order to determine the field to which the input data set belongs. According to the field determination result, a route change unit 13 same as that shown in FIG. 3 changes the route construction between the introduction layer IDU and the input layer IN. After the route construction is changed, the input data set is inputted in the neural network NN via the introduction layer IDU and the changed routes. The neural network NN executes the learning using the input data set and teaching data and progressively changes weights and threshold values.

Here, the connection condition of the neural network NN is changed according to a back propagation method, whereby each of the input parameters is converted according to a transfer function, with a weight that is used to multiply each converted input parameter being changed along with the threshold value for each unit by a predetermined method based on the deviation e. Here, a sigmoidal tangent function ($f(x)=\tanh(x)$) is used as the transfer function. However, so long as the neural network NN can estimate the air/fuel ratio from each of the stated parameters, a function of other types may also be used.

On completing the above learning, input data sets that were not used for the learning and input data sets that are newly generated when driving the car after the learning are successively inputted in the neural network NN to compare the estimated air/fuel ratio (A/FNN) with the teaching data (air/fuel ratio (A/Ft)) for each field. By doing so, the estimation accuracy and the generalization ability of the neural network NN for each field are judged. The generalization ability here means whether the high estimation accuracy is maintained for those input data sets that were not used in the learning process. For instance, when the number of input data sets that result in the deviation e exceeding 0.5 is equal to or more than 20% of the total number of input data sets that belong to a field, the estimation accuracy and the generalization ability for that field are judged as poor. When the estimation accuracy or the generalization ability for a certain field is judged as poor, the route change unit 13 sets the routes between the introduction layer IDU and the input layer IN according to the field, and the neural network NN executes relearning using learning data sets corresponding to the field. Thus, the estimation accuracy and the generalization ability for the field can be improved by performing the relearning on the connection condition corresponding to the field, without affecting connection conditions corresponding to the other fields.

As a result of the above process, the neural network NN can estimate the actual air/fuel ratio (A/Fr) from an input data set. The same learning process is performed for the neural network of the other embodiments at the time of production. The following is an explanation of the control operation of the air/fuel ratio of the engine E in the air/fuel ratio control apparatus that uses the neural network NN after completing the learning.

Figure 10:
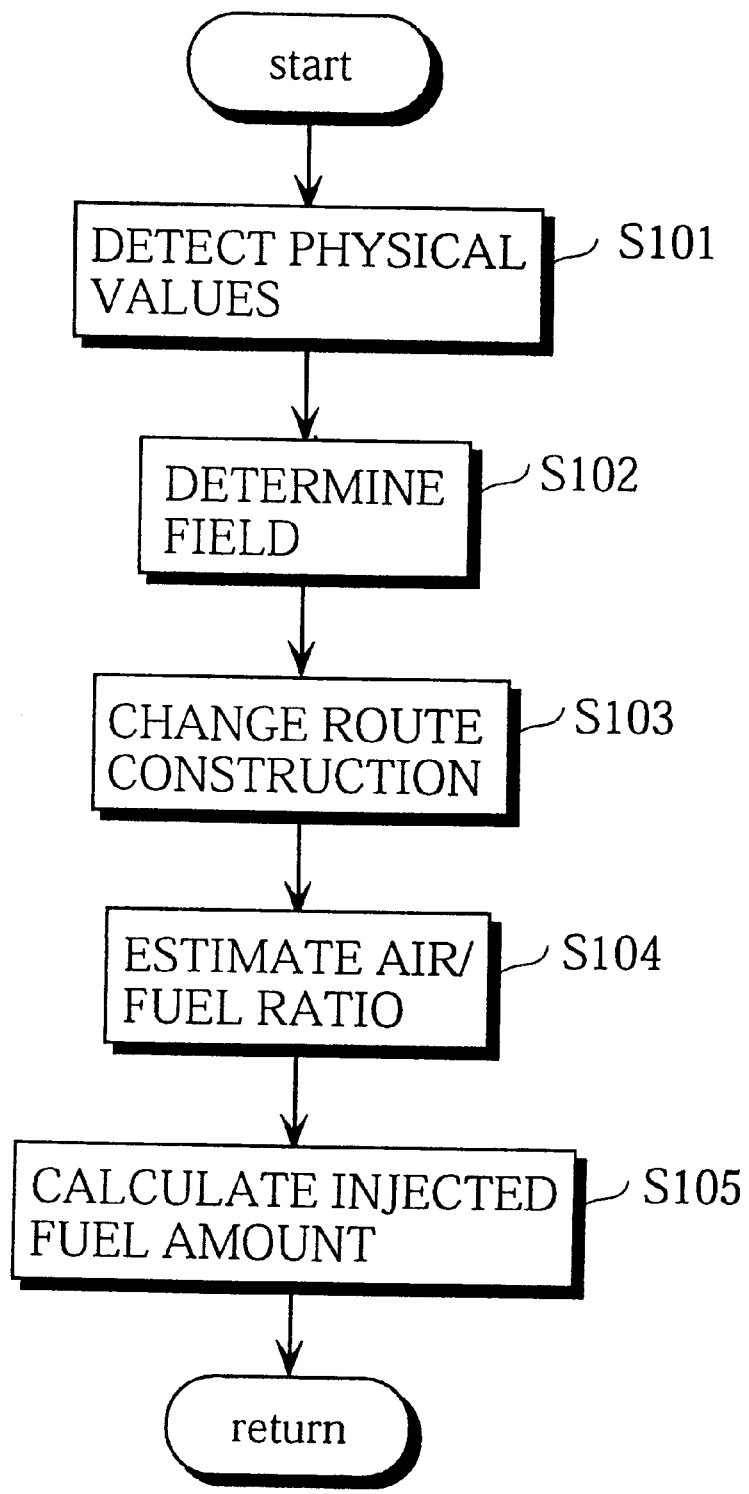
FIG. 10 is a flowchart showing the control operation of the air/fuel ratio control apparatus of the first embodiment.

FIG. 10 is a flowchart showing the control operation of the air/fuel ratio control apparatus in one control cycle.

First, the state detection unit 3 detects physical values of engine RPM (Ne), intake air pressure (Pb), present throttle amount (THL), injected fuel amount (Gf), intake air temperature (Ta), cooling water temperature (Tw), and air/fuel ratio (A/Fk) as an input data set that shows the state of the engine E (Step S101).

Next, the field determination unit 12 determines the field to which the input data set belongs from the detected engine RPM (Ne), intake air pressure (Pb), intake air temperature (Ta), and the cooling water temperature (Tw) (Step S102). According to the field determination result, the route change unit 13 changes the route construction between the introduction layer IDU and the input layer IN of the neural network NN (Step S103).

The NN estimation unit 11 uses the input data set and estimates the air/fuel ratio (A/FNN) (Step S104). The injected fuel amount calculation unit 2 calculates the injected fuel amount (Gf) from the estimated air/fuel ratio (A/FNN) (Step S105). The calculated injected fuel amount (Gf) is then outputted to the injector I which injects the indicated amount of fuel into the engine E. With the above operation, the air/fuel ratio can be accurately controlled when the engine condition is in a transitional state.

<Field Determination and Route Change Based on Fuzzy Inference Rule>

The field determination and the route change using the fuzzy inference rule are explained next.

Figure 11:
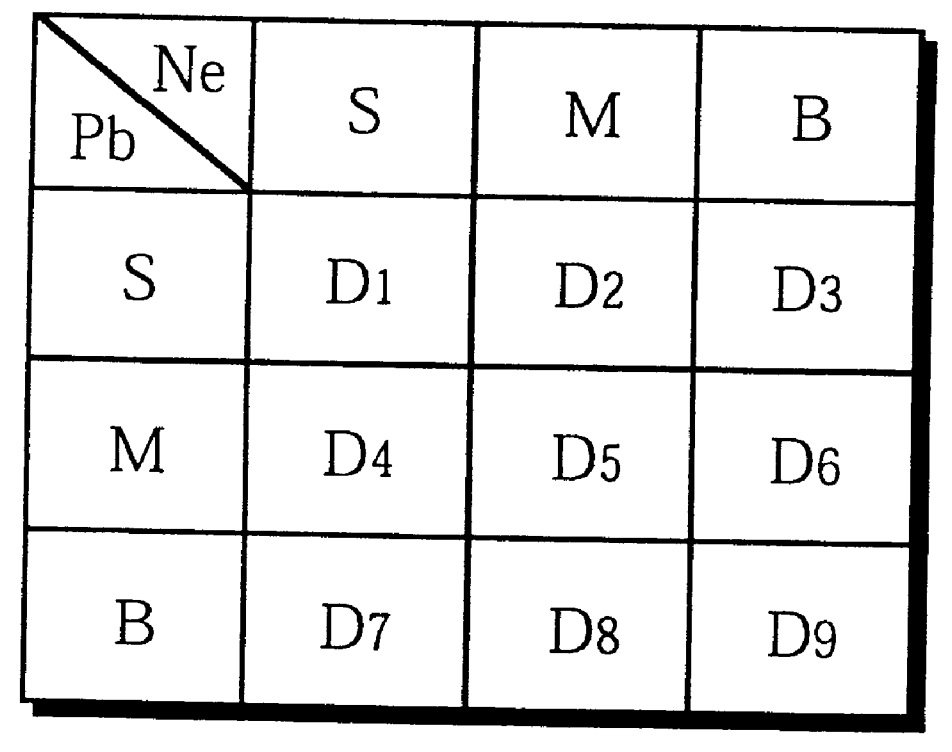

To simplify the explanation, the engine RPM (Ne) and the intake air pressure (Pb) are used as the parameters for determining the field in this example. As shown in FIG. 11, the two parameters are each divided into three ranges that are S (small), M (medium), and B (big). As a result, nine fields D1–D9 are generated.

Figure 12:
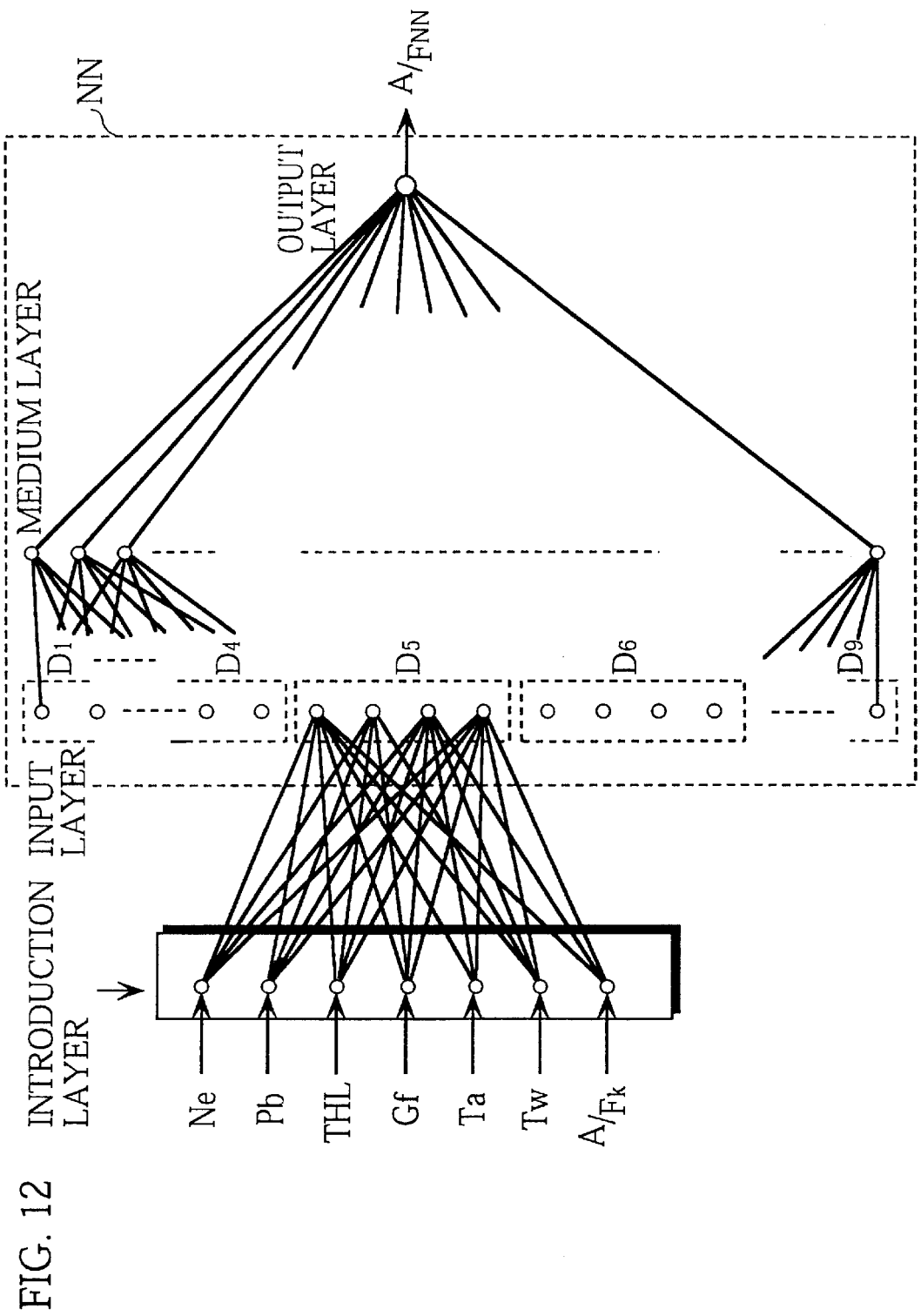
FIG. 12 shows an example of the construction of the neural network to which the fuzzy inference rule is applied.

Also, the input layer IN of the neural network NN in the NN estimation unit 11 is constructed such that each field is associated with four consecutive IN units in the present example. Accordingly, the route change unit 13 selects routes that connect each IDU unit to four consecutive IN units. When an input data set in the introduction layer IDU belongs to field D5, for example, the route change unit 13 selects the routes that lead to the four IN units associated with field D5, as shown in FIG. 12.

Each field D1–D9 is expressed as follows according to the fuzzy inference rule.

if Ne=S and Pb=S then field=D1
if Ne=M and Pb=S then field=D2
if Ne=B and Pb=S then field=D3
if Ne=S and Pb=M then field=D4 . . . (α)
if Ne=M and Pb=M then field=D5 . . . (β)
if Ne=B and Pb=M then field=D6
if Ne=S and Pb=B then field=D7
if Ne=M and Pb=B then field=D8
if Ne=B and Pb=B then field=D9

Figure 13A:
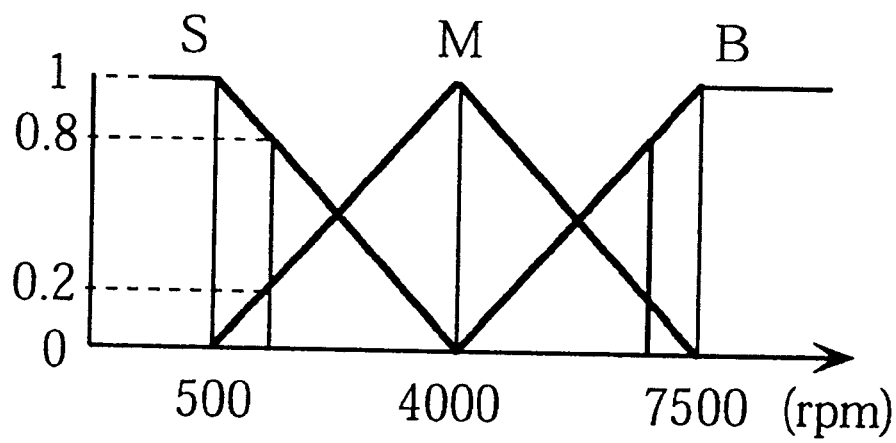
FIG. 13A shows membership functions for engine RPM (Ne)
Figure 13B:
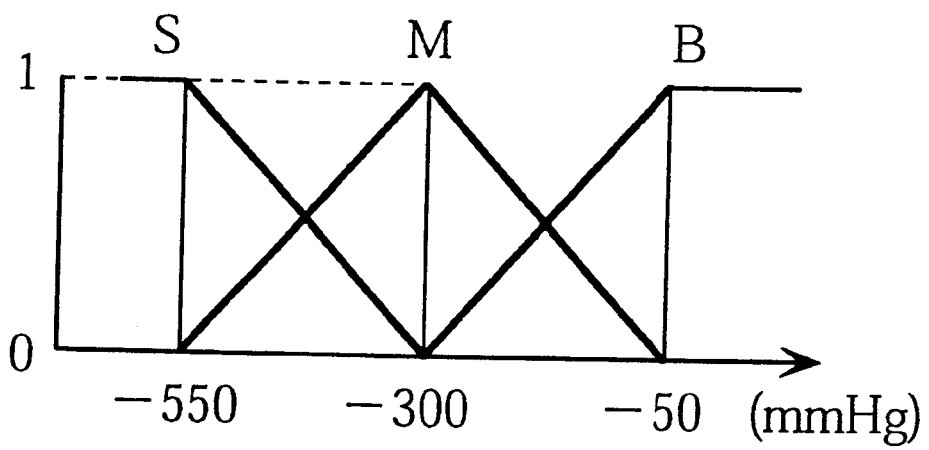
FIG. 13B shows membership functions for intake air pressure (Pb)

FIGS. 13A and 13B respectively show membership functions in the triangle form for the engine RPM (Ne) and the intake air pressure (Pb). Note that different forms of membership functions, such as bell and trapezoid, can also be used.

Suppose the detected engine RPM (Ne) and intake air pressure (Pb) are respectively 1000 rpm and −300 mmHg. The following fuzzy inference is performed by the field determination unit 12.

The fitness degree of each parameter is defined as below according to the membership functions shown in FIGS. 13A and 13B.

Ne: S=0.8, M=0.2, B=φ
Pb: S=φ, M=1, B=φ

These fitness degrees correspond to the combinations (α) and (β) according to the fuzzy inference rule. Here, in accordance with the min-max method, the fitness degree for the combination (α) (field=D4) is 0.8, while the fitness degree for the combination (β) (field=D5) is 0.2.

Figure 14:
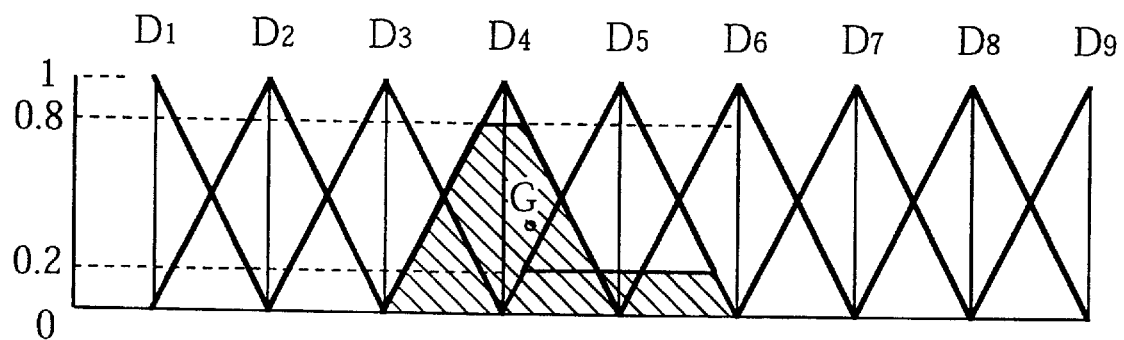
FIG. 14 shows membership functions for the fields.

In FIG. 14, the hatched area corresponds to the fitness degrees of the two parameters. The figure shows the membership functions in which fields D1–D9 are shown in the horizontal axis. A centroid G of the hatched area is detected and set as the center corresponding to the engine RPM (Ne) and the intake air pressure (Pb) that are respectively 1000 rpm and −300 mmHg.

Figure 15:
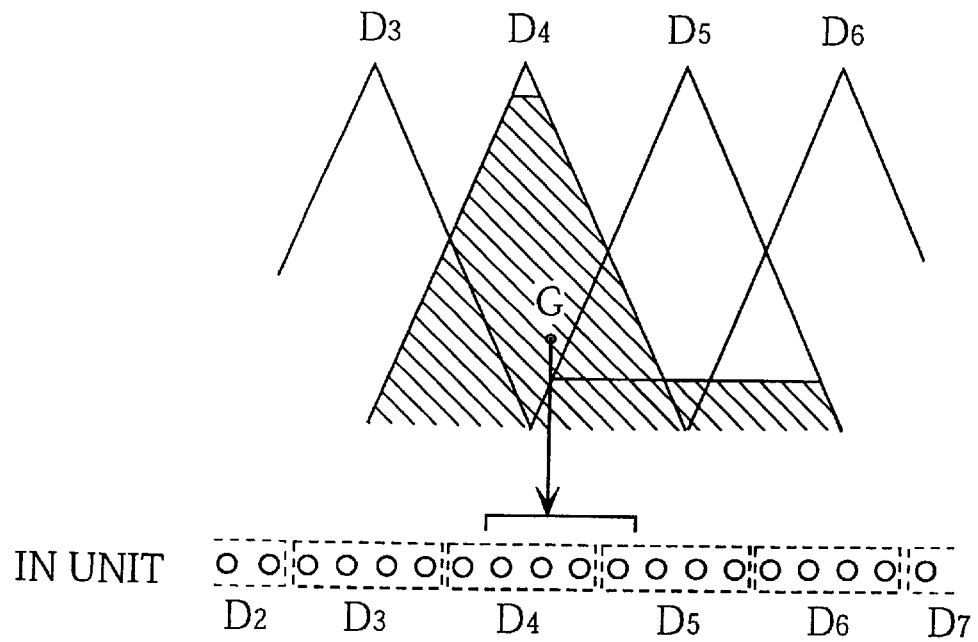
FIG. 15 shows a model example of the route selection method according to the fuzzy inference result.

The route change unit 13 selects routes between the introduction layer IDU and the input layer IN based on the position of the centroid G. Here, since the centroid G is located within field D4 but leans a little to field D5, the composition degree of the IN units corresponding to field D4 and the IN units corresponding to field D5 is determined by the position of the centroid G. When the IN units are arranged in association with the membership functions in FIG. 15, four IN units that correspond to the hatched area which centers on the centroid G, namely, the four consecutive IN units composed of three units in field D4 and one unit in field D5, are selected. The route change unit 13 accordingly selects routes that lead to these four IN units.

While the route change unit 13 changes the route selection pattern based on the fuzzy inference rule in the present example, the route change unit 13 may instead change a weight of each route. Suppose, in the route construction which associates each field with one of the IN units, the fuzzy inference result shows that the fitness degree for a field associated with unit A is 0.8 while the fitness degree for a field associated with unit B is 0.2. In such a case, the weight 0.8 is assigned to each route that leads to unit A, while the weight 0.2 is assigned to each route that leads to unit B. By doing so, the fuzzy inference result can be reflected on the connection condition between the introduction layer IDU and the input layer IN.

Second Embodiment

The route selection pattern between the introduction layer IDU and the input layer IN is changed according to the proximity of the centroid G to an adjacent field using the membership functions shown in FIG. 14 in the first embodiment. In the second embodiment, the weight construction between the introduction layer IDU and the input layer IN is changed according to the proximity of the centroid G to the adjacent field.

Figure 16:
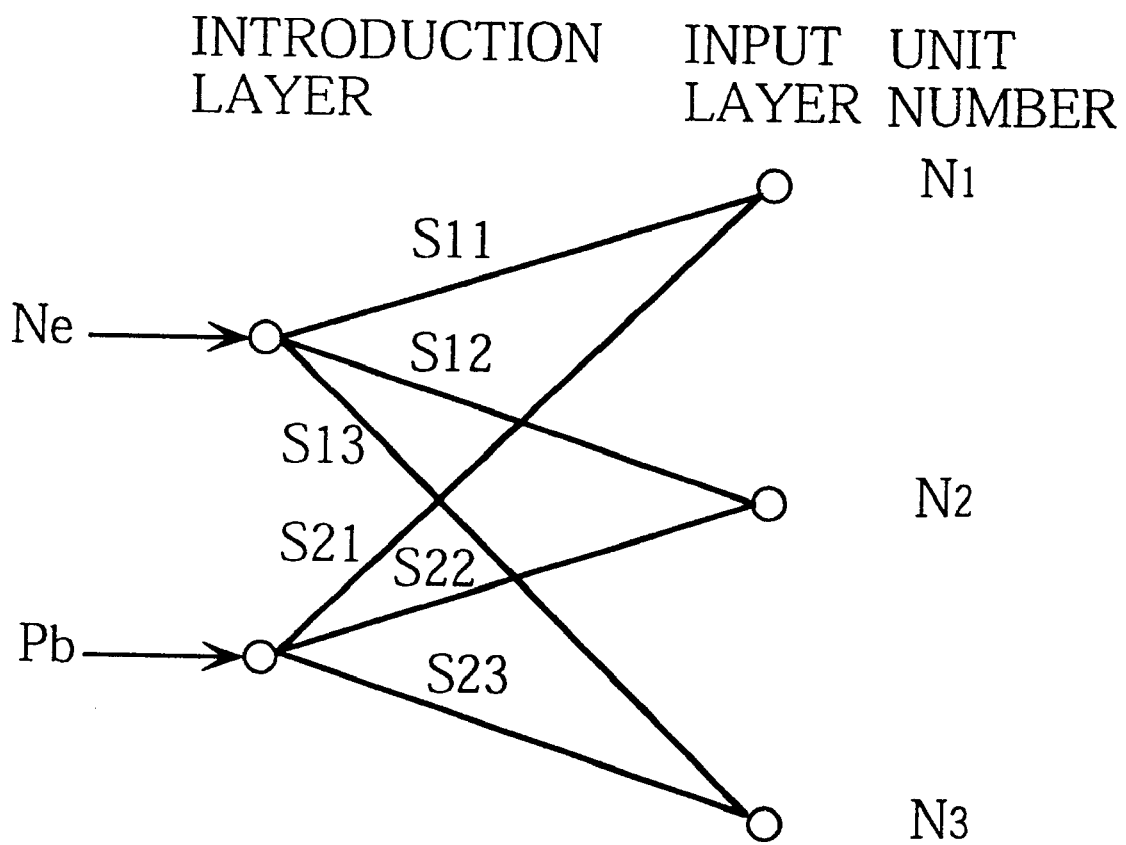
FIG. 16 shows an example of the construction of the neural network to which the fuzzy inference rule is applied in the second embodiment.

FIG. 16 shows an example of changing the weights S11, S12, S13, ..., S23 according to the fuzzy inference rule. In the figure, N1, N2, and N3 each represent one of the IN units in the input layer IN.

Figure 17:
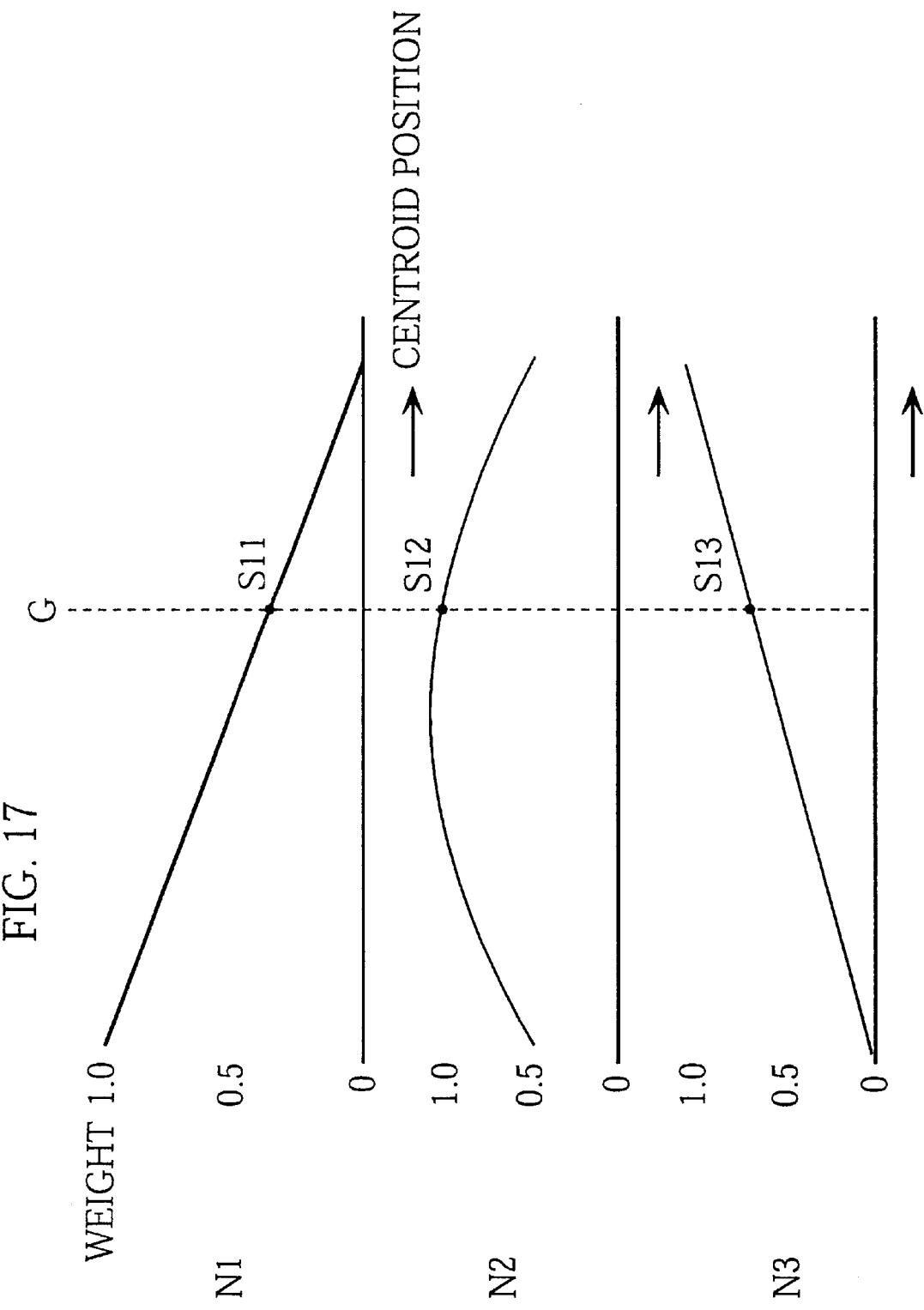
FIG. 17 shows changes in the weight of each route between the introduction layer IDU and the input layer IN according to the centroid position.

FIG. 17 shows an example of the graph according to which the connection condition between the IDU unit whose input is the engine RPM (Ne) and each IN unit N1–N3 is determined. The horizontal axis shows the centroid position. If the position of the centroid G in the hatched area shown in FIG. 15 corresponds to the dotted line G in FIG. 17, the weights S11, S12, and S13 are approximately set at 0.3, 0.8, and 0.6, respectively.

Third Embodiment

Figure 18:
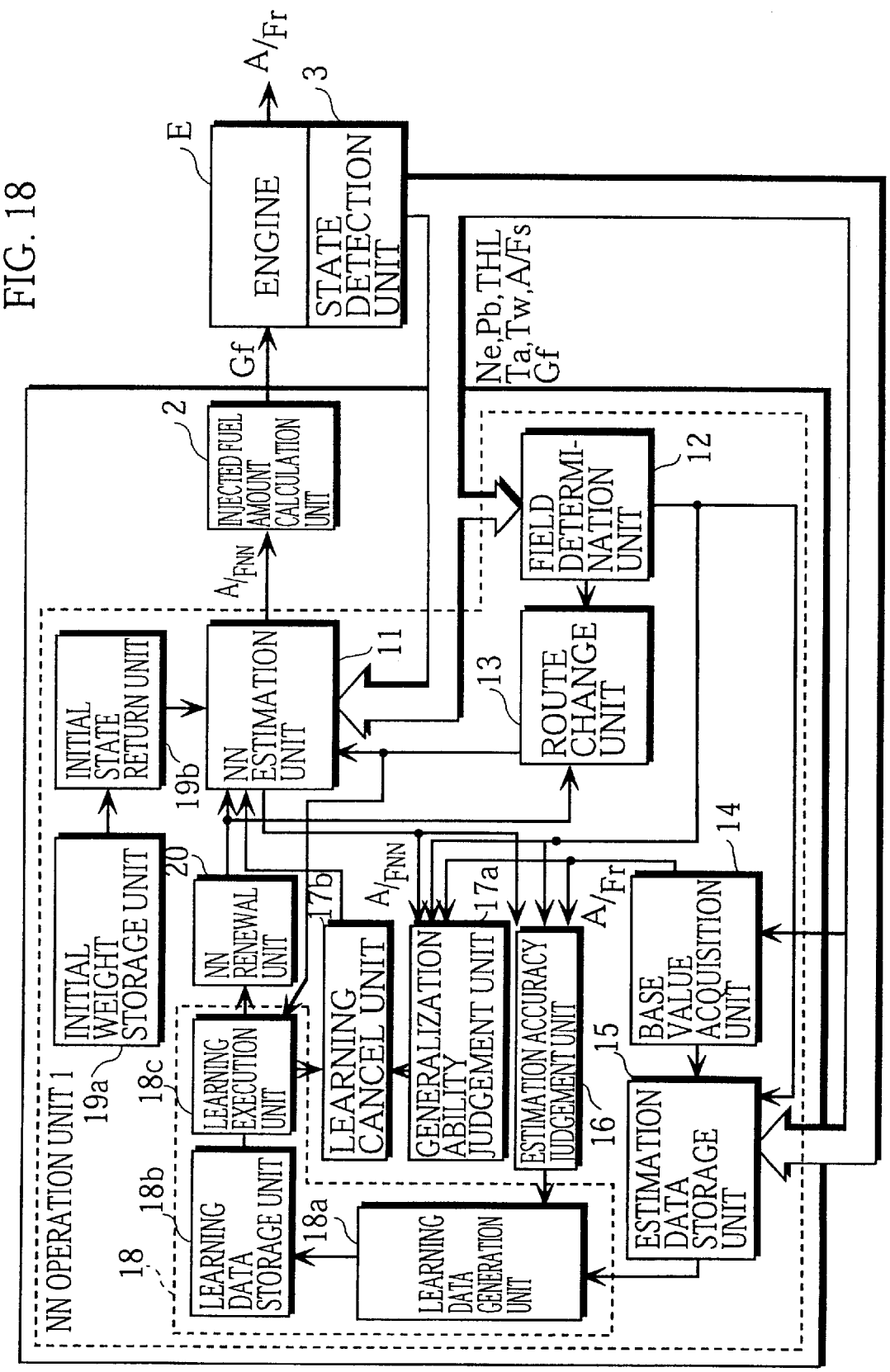
FIG. 18 is a functional block diagram showing the air/fuel ratio control apparatus of the third embodiment.

FIG. 18 is a functional block diagram showing the air/fuel ratio control apparatus of the third embodiment. This air/fuel ratio control apparatus differs with the first embodiment in that the online learning is possible. This difference is reflected on the construction of a NN operation unit 1 shown in FIG. 18.

In addition to the components included in the NN operation unit 1 of the first embodiment, the NN operation unit 1 of the third embodiment further includes a base value acquisition unit 14, an estimation data storage unit 15, an estimation accuracy judgement unit 16, a generalization ability judgement unit 17a, a learning cancel unit 17b, a learning data generation unit 18a, a learning data storage unit 18b, a learning execution unit 18c, a NN renewal unit 20, an initial weight storage unit 19a, and an initial state return unit 19b.

<Base Value Acquisition Unit>

The base value acquisition unit 14 acquires the actual air/fuel ratio (A/Fr) corresponding to the air/fuel ratio (A/FNN) estimated by the NN estimation unit 11 as the base value in each control cycle. Here, the base value is obtained by adjusting the air/fuel ratio (A/Fk) detected by the air/fuel ratio sensor q in the state detection unit 3 for the detection time delay.

<Estimation Data Storage Unit>

The estimation data storage unit 15 stores each combination that is made up of: an input data set detected by the state detection unit 3; a field that is determined by the field determination unit 12 for the input data set; and a base value corresponding to the input data set.

<Estimation Accuracy Judgement Unit>

The estimation accuracy judgement unit 16 compares the estimated air/fuel ratio (A/FNN) with the corresponding base value to judge the estimation accuracy for each field. Here, when an average absolute value for differences between estimated air/fuel ratios (A/FNN) for one field obtained within a fixed accuracy judgement period and corresponding base values is below a predetermined set value, the estimation accuracy for the field is judged as satisfactory. On the other hand, when the average absolute value is equal to or more than the predetermined set value, the estimation accuracy for the field is judged as poor. In the present example, the accuracy judgement period is set at one hour, while the predetermined set value is set at 0.8.

It should be noted that when the number of estimated air/fuel ratios (A/FNN) obtained within one hour does not exceed a predetermined number, such as 10, the estimation accuracy judgement unit 16 does not judge the accuracy in order to prevent the neural network NN from performing unnecessary relearning. For instance, when the estimation accuracy decreases due to a temporary factor, such as the occurrence of sensor noise, it is not appropriate to perform relearning.

The accuracy judgement period can be set according to a time interval or an estimation frequency of the NN estimation unit 11. Alternatively, the accuracy judgement period can be set as a period in which the number of estimated air/fuel ratios (A/FNN) for each field reaches a predetermined number, such as 50. The above modifications also apply to other types of periods described in this specification. Also, while it is judged whether the average value for the differences between the estimated air/fuel ratios (A/FNN) and the corresponding base values is below the predetermined set value in the present example, a distribution value for the differences may instead be used for the accuracy judgement.

Also, instead of comparing the average or distribution value for the differences between the estimated air/fuel ratios (A/FNN) and the corresponding base values with the predetermined set value, the estimation accuracy judgement unit 16 may count by 1, when a difference between an estimated air/fuel ratio (A/FNN) and a corresponding base value is equal to or more than the predetermined set value (0.8). When the number counted as such for one field exceeds a predetermined number (such as 20) within the fixed accuracy judgement period (one hour), the estimation accuracy for the field is judged as poor. When, on the other hand, the number does not exceed the predetermined number, the estimation accuracy for the field is judged as satisfactory.

<Learning Data Generation Unit>

When the estimation accuracy for at least one field (learning target field) is judged as poor, the learning data generation unit 18*a* reads input data sets that belong to the learning target field and corresponding base values from the estimation data storage unit 15 and generates learning data sets (each being composed of an input data set and corresponding teaching data).

The learning data storage unit 18*b* stores the generated learning data sets.

<Learning Execution Unit>

The learning execution unit 18*c* uses the learning data sets stored in the learning data storage unit 18*b* within a fixed storage period and executes learning on the neural network NN in the connection condition corresponding to the learning target field to obtain the new connection condition. More specifically, the learning execution unit 18*c* reads a program that realizes the neural network NN of the NN estimation unit 11. After the route change unit 13 changes the route construction between the introduction layer IDU and the input layer IN according to the learning target field, the learning execution unit 18*c* changes the connection condition of the neural network NN using the learning data sets based on the back propagation method to obtain the new connection condition. The learning data generation unit 18*a*, the learning data storage unit 18*b*, and the learning execution unit 18*c* compose a learning unit 18 in the NN operation unit 1.

<NN Renewal Unit>

When the new connection condition for the learning target field is obtained by the learning execution unit 18*c*, the NN renewal unit 20 renews the neural network NN in the NN estimation unit 11 based on the new connection condition.

<Generalization Ability Judgement Unit>

The generalization ability judgement unit 17*a* compares an air/fuel ratio (A/FNN) estimated by the renewed neural network with a corresponding base value to judge the generalization ability of the neural network for the learning target field. The generalization ability decreases mainly due to over-learning or when the learning results show local minimum values that should not be converged. In order to tackle these problems, the generalization ability judgement unit 17*a* judges the generalization ability of the neural network NN. The specific operation of the generalization ability judgement unit 17*a* is explained in detail later.

<Learning Cancel Unit>

The learning cancel unit 17*b* stores the pre-renewal connection condition corresponding to the learning target field. When the generalization ability is judged as poor by the generalization ability judgement unit 17*a*, the learning cancel unit 17*b* changes the new connection condition of the neural network NN to the pre-renewal connection condition.

<Initial Weight Storage Unit>

The initial weight storage unit 19*a* stores the initial connection condition that was set at the time of producing the neural network NN.

<Initial State Return Unit>

The initial state return unit 19*b* returns the neural network NN in the NN estimation unit 11 to the initial state according to the initial connection condition stored in the initial weight storage unit 19*a*. The initial state return unit 19*b* is activated when the user turns on a predetermined switch. Alternatively, the initial state return unit 19*b* may be activated according to a predetermined signal that is generated when replacing the deteriorating air/fuel ratio sensor with a new sensor.

<Online Learning Operation>

The following is an explanation of the online learning operation of the air/fuel ratio control apparatus with the above construction. The control operation of the air/fuel ratio control apparatus of the third embodiment is the same as the first embodiment and so is not explained here.

Figure 19:
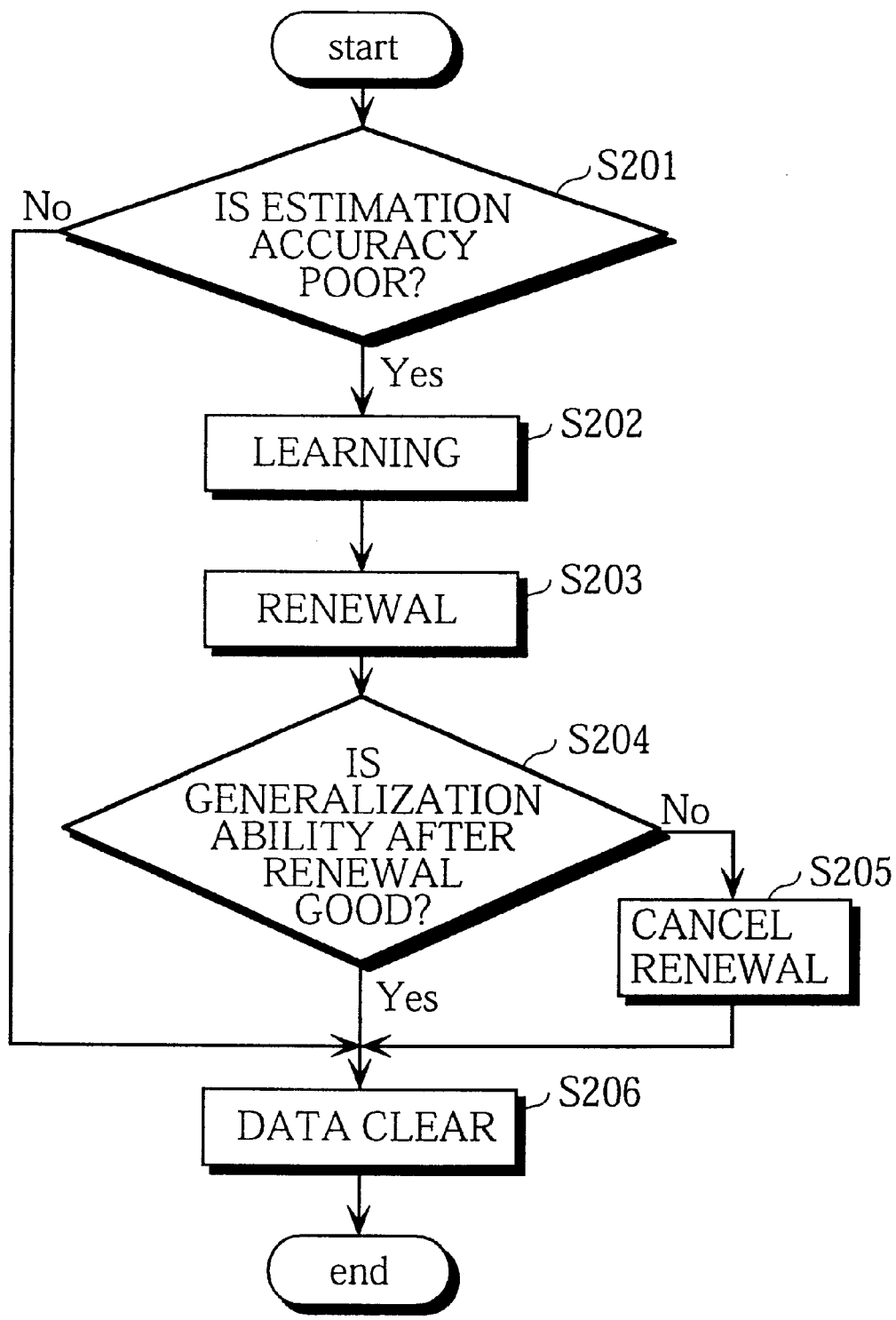
FIG. 19 is a flowchart showing the online learning operation of the air/fuel ratio control apparatus of the third embodiment.

FIG. 19 is a flowchart showing the learning operation in one learning cycle. First, the base value acquisition unit 14 acquires an actual air/fuel ratio (A/Fr) as a base value corresponding to an air/fuel ratio (A/FNN) estimated by the NN estimation unit 11 in each control cycle and outputs the base value to the estimation accuracy judgement unit 16. The estimation accuracy judgement unit 16 calculates the difference between the estimated air/fuel ratio (A/FNN) and the received base value (A/Fr), stores the difference that corresponds to a field determined by the field determination unit 12, and adds the difference to differences corresponding to the same field that have been obtained in the previous control cycles. This addition is repeated until 100 differences are totaled for each field. Meanwhile, the estimation data storage unit 15 stores each combination of an input data set, a field, and a base value.

The estimation accuracy judgement unit 16 then totals another 100 differences for each field.

Figure 20:
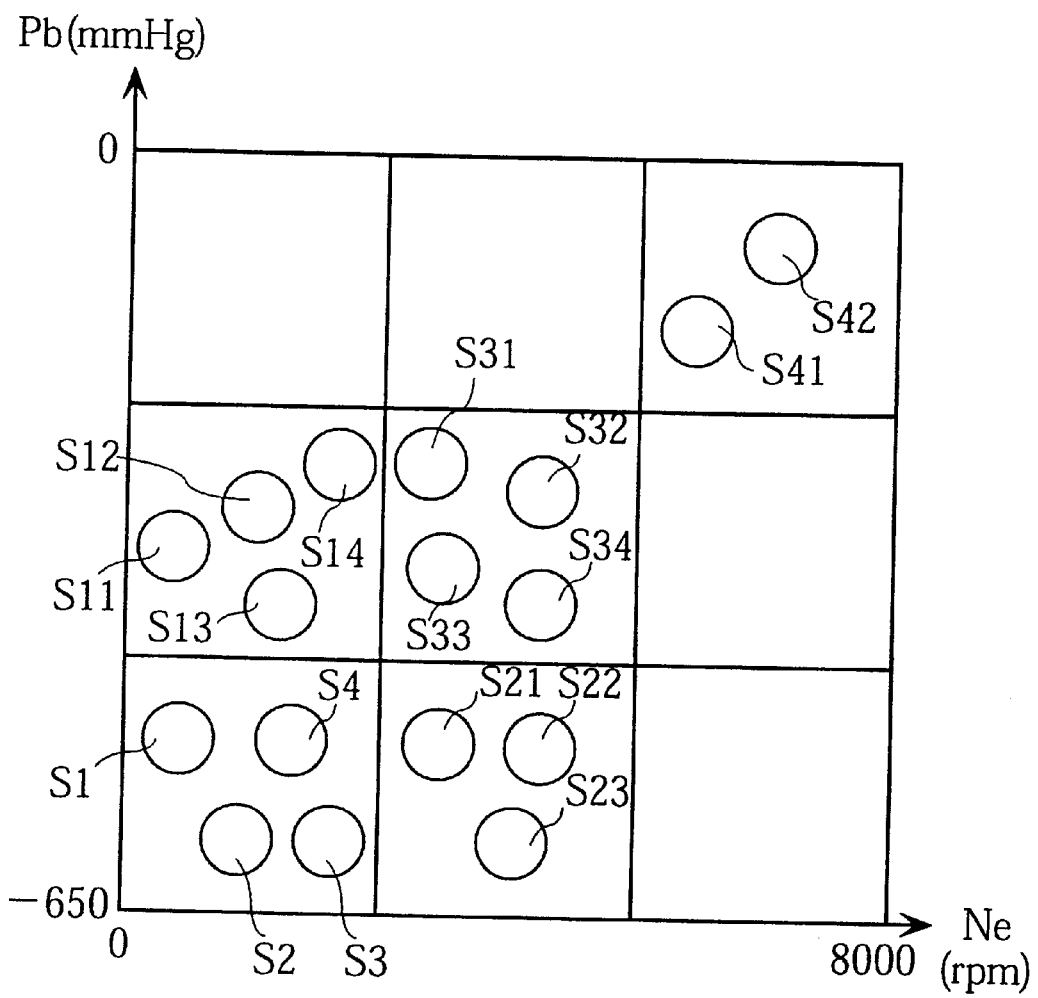
FIG. 20 shows a state of the fields as a result of repeatedly totaling 100 differences within a fixed period.

After the estimation accuracy judgement unit 16 repeats this process for one hour, the totals S1, S2, . . . , S42 that are each a total of 100 differences are generated for each field, as shown in FIG. 20. These totals are added together in each field and as a result the average for the plurality of differences is calculated. It is then judged whether the average difference is equal to or more than the predetermined set value (Step S201). Next, the following operation is performed in parallel with the above operation of the estimation accuracy judgement unit 16 in Step S201.

When there is at least one field (learning target field) where the estimation accuracy is judged as poor by the estimation accuracy judgement unit 16, the learning data generation unit 18*a* reads input data sets that belong to the learning target field and corresponding base values from the estimation data storage unit 15 and generates learning data sets. The learning data sets are then stored in the learning data storage unit 18*b*. The learning execution unit 18*c* reads the program that realizes the neural network NN of the NN estimation unit 11. After the route change unit 13 changes the route construction between the introduction layer IDU and the input layer IN according to the learning target field, the learning execution unit 18*c* changes the connection condition of the neural network NN and obtains the new connection condition corresponding to the learning target field (Step S202).

On completing the learning and obtaining the new connection condition, the NN renewal unit 20 renews the neural network NN in the NN estimation unit 11 based on the new connection condition corresponding to the learning target field. This renewal is performed when the engine E is in a normal condition and the air/fuel ratio does not have to be controlled, such as when the engine E is idling (step S203).

After the neural network NN is renewed, the generalization ability judgement unit 17a totals 100 differences between air/fuel ratios (A/FNN) estimated by the NN estimation unit 11 and corresponding base values for the learning target field. The generalization ability judgement unit 17a then judges whether the total is below a predetermined value (such as 30) (Step S204).

When the total is below the predetermined value, the generalization ability is judged as satisfactory. When the total is equal to or more than the predetermined value, on the other hand, the generalization ability is judged as poor. In this case, the learning cancel unit 17b returns the neural network NN in the NN estimation unit 11 to the pre-renewal connection condition (Step S205).

On completing the above operation, learning data sets stored in the learning data storage unit 18b are cleared (Step S206). Alternatively, the learning data sets in the learning data storage unit 18b may not be cleared but used along with newly generated learning data sets in the next learning cycle. It is also possible to clear learning data sets other than learning data sets generated within the latest one hour.

With the above learning operation, when the state of the engine E is outside the range covered by the learning at the time of production or when the air/fuel ratio sensor deteriorates, the estimation accuracy can be improved by the above online learning operation. Also, since the learning is performed on the neural network NN in the connection condition corresponding to the learning target field, the estimation accuracy for the other fields is not affected.

The following is an explanation of the operation of the initial weight storage unit 19a and the initial state return unit 19b. When the user sends a signal by operating the predetermined switch to the initial state return unit 19b, the initial state return unit 19b returns the neural network NN to the initial state using the initial connection condition that was set at the time of production and that is stored in the initial weight storage unit 19a.

Suppose the online learning is executed and the neural network NN in the NN estimation unit 11 is renewed in response to the decrease in the air/fuel ratio estimation accuracy due to the deterioration of the air/fuel ratio sensor. When the air/fuel ratio sensor is replaced with a new sensor, the air/fuel ratio estimation by the renewed neural network may become inaccurate. When this happens, it is better to return the neural network NN to the initial state. In the same way, when the construction of the neural network NN becomes uncontrollable as a result of the online learning or when the owner of the car changes and as a result the driving environment changes, it may be preferable to return the neural network NN to the initial state. The initial weight storage unit 19a and the initial state return unit 19b are included in the air/fuel ratio control apparatus in order to address such needs.

While the route construction is changed according to the field determined by the field determination unit 12 in the present embodiment, it is also possible to apply the fuzzy inference rule to the route determination as in the first embodiment.

Fourth Embodiment

In the third embodiment, when the generalization ability judgement unit 17a judges the generalization ability of the renewed neural network as poor, the new connection condition for the learning target field is canceled and the neural network NN is returned to the pre-renewal connection condition. However, it is also possible to perform relearning on the renewed neural network. In the fourth embodiment, the air/fuel ratio control apparatus is constructed such that the relearning is executed on the renewed neural network.

Figure 21:
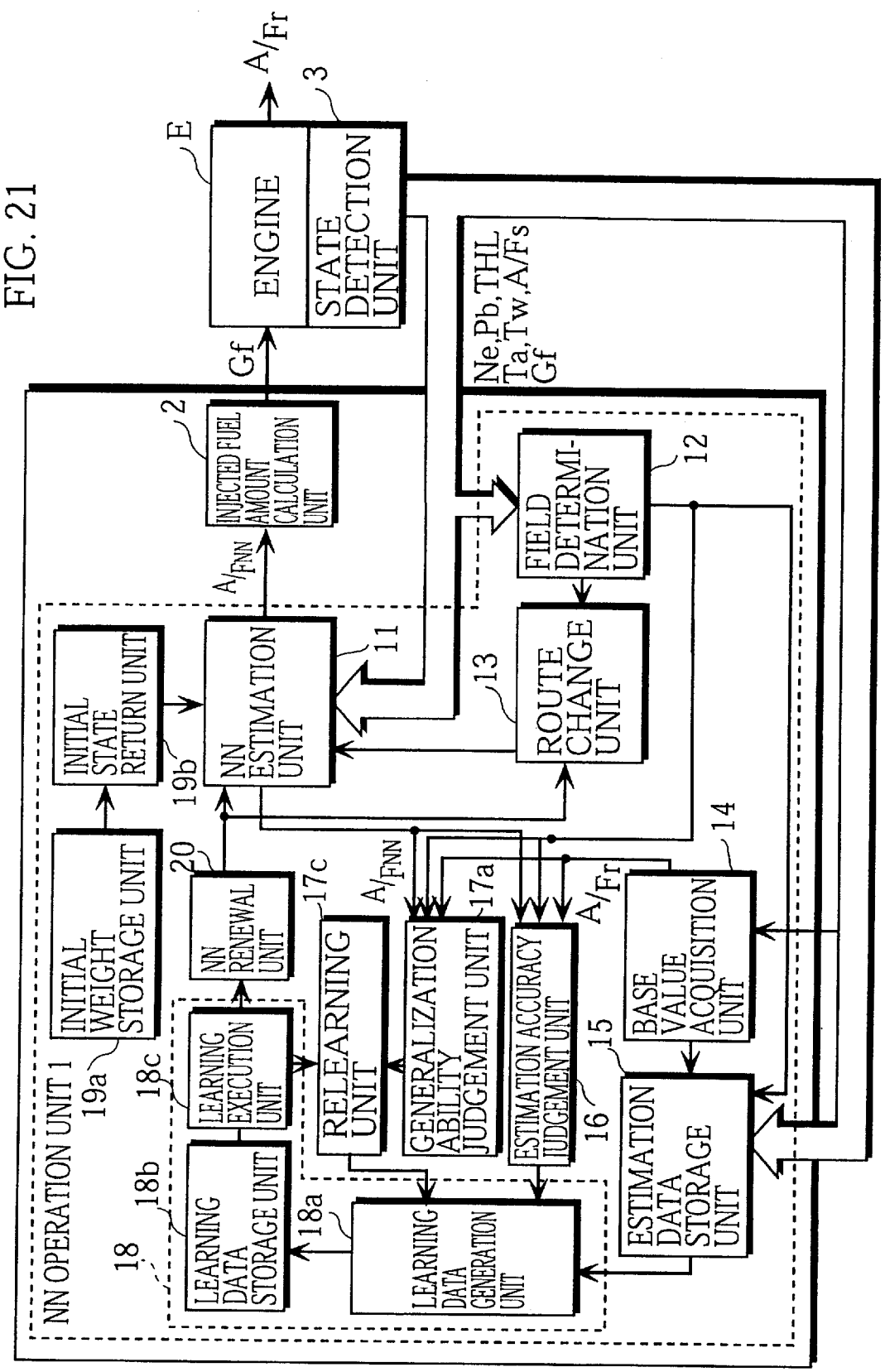
FIG. 21 is a functional block diagram showing the air/fuel ratio control apparatus of the fourth embodiment.

FIG. 21 is a functional block diagram showing the air/fuel ratio control apparatus of the fourth embodiment.

In the figure, the difference with the air/fuel ratio control apparatus of the third embodiment shown in FIG. 18 lies in that the learning cancel unit 17b is replaced with a relearning unit 17c. Other components are the same as the third embodiment.

<Relearning Unit>

When there is at least one field where the generalization ability is judged as poor, the relearning unit 17c has the learning unit 18 perform the relearning for the field (relearning target field). Here, the learning data generation unit 18a reads input data sets belonging to the relearning target field and corresponding base values from the estimation data storage unit 15 and generates learning data sets for the relearning target field. The generated learning data sets are then stored into the learning data storage unit 18b. The learning execution unit 18c performs the relearning on the new connection condition of the neural network NN corresponding to the relearning target field using the stored learning data sets.

Here, the relearning is performed under a condition different from the previous learning, in view of the possibilities that the previous learning was over-learning or the learning results showed local minimum values. For example, different initial values or fewer learning data sets may be used in the relearning stage. Other modifications are also possible, such as the use of newly generated learning data sets.

<Online Learning Operation>

Figure 22:
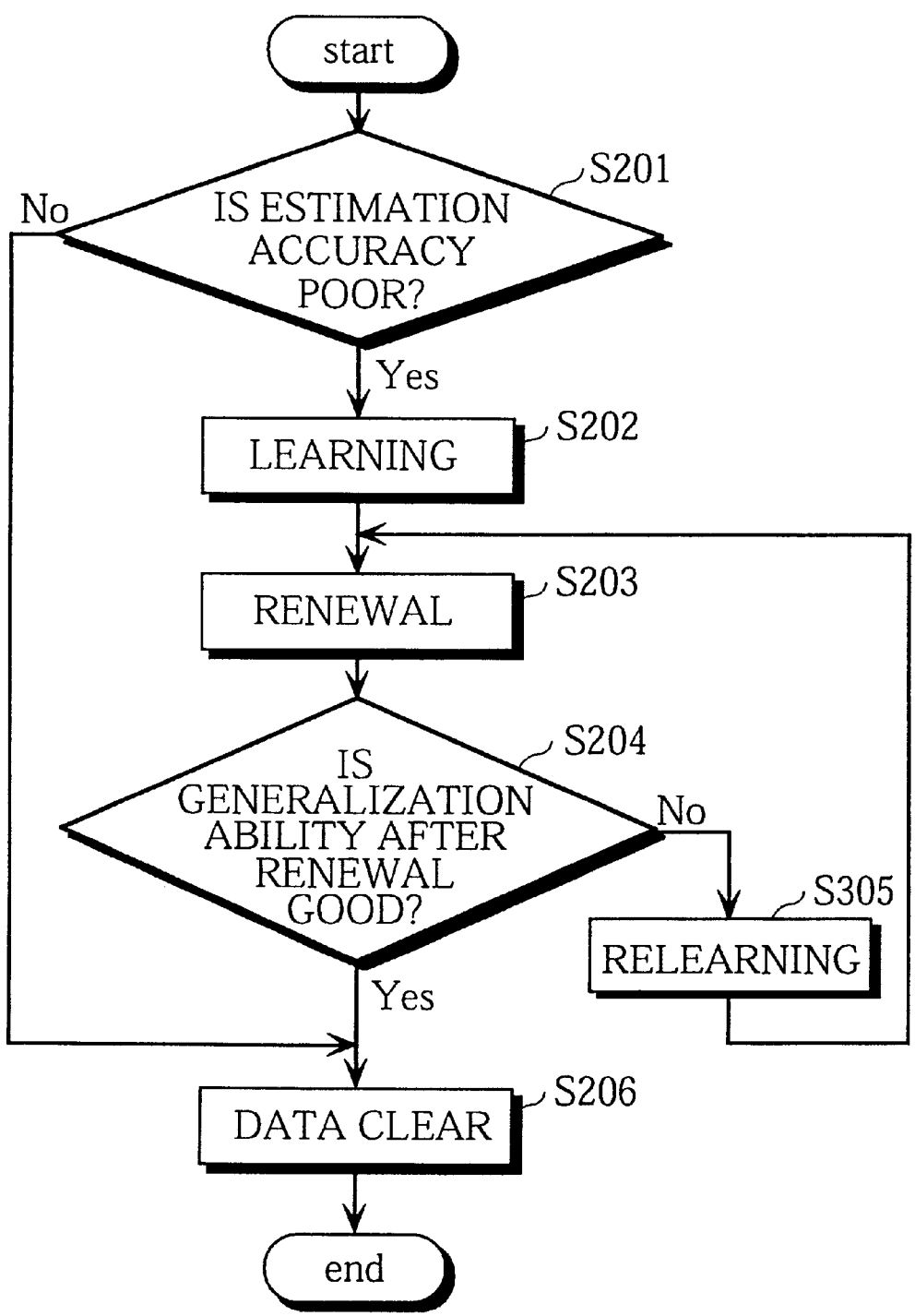
FIG. 22 is a flowchart showing the online learning operation of the air/fuel ratio control apparatus of the fourth embodiment.

The following is an explanation of the online learning operation of the air/fuel ratio control apparatus with the above construction. FIG. 22 is a flowchart showing the online learning operation. The difference with the flowchart of the third embodiment shown in FIG. 19 lies in that the relearning is performed instead of canceling the learning result in Step S205.

The estimation accuracy judgement (step S201) to the generalization ability judgement (Step S204) are the same as the third embodiment and are not explained here. If the generalization ability of the renewed neural network for each learning target field is judged as satisfactory in Step S204, learning data sets in the learning data storage unit 18b are cleared in the same way as the third embodiment (Step S206). On the other hand, it there is at least one learning target field where generalization ability is judged as poor, the relearning unit 17c has the learning unit 18 perform the relearning for the field (relearning target field) and obtain the newer connection condition (Step S305).

After obtaining the newer connection condition, the operation returns to Step S203 where the NN renewal unit 20 further renews the neural network NN in the NN estimation unit 11 corresponding to the relearning target field based on the newer connection condition. Steps S204, S305, and S203 are repeated until the generalization ability for all relearning target fields is improved.

With the above operation, the learning is performed to improve the estimation accuracy of the neural network NN and then the relearning is performed to improve the generalization ability of the renewed neural network NN. As a result, the connection condition of the neural network NN can be efficiently modified.

Fifth Embodiment

The NN renewal unit 20 renews the neural network NN in the NN estimation unit 11 immediately after the learning execution unit 18c obtains the new connection condition in the third and fourth embodiments. In the fifth embodiment, the generalization ability of the new connection condition of the neural network NN is judged before actually renewing the neural network NN.

Figure 23:
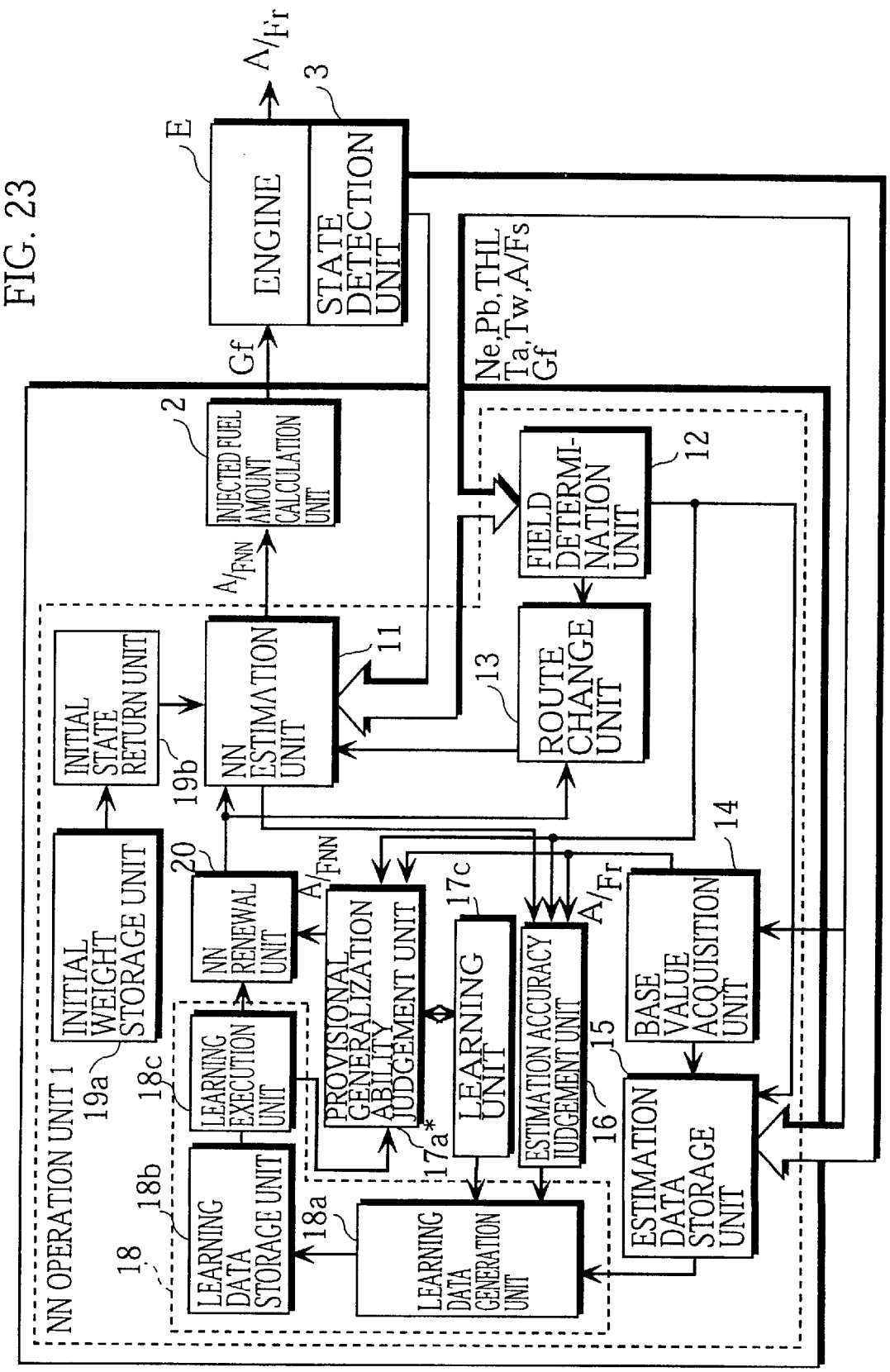
FIG. 23 is a functional block diagram showing the air/fuel ratio control apparatus of the fifth embodiment.

FIG. 23 is a functional block diagram showing the air/fuel ratio control apparatus of the fifth embodiment. This air/fuel ratio control apparatus differs with the fourth embodiment in that the generalization ability judgement unit 17a is replaced with a provisional generalization ability judgement unit 17a* and that the NN renewal unit 20a has a different function.

<Provisional Generalization Ability Judgement Unit>

The provisional generalization ability judgement unit 17a* compares an air/fuel ratio (A/FNN), estimated by a provisional neural network that has the new connection condition corresponding to the learning target field obtained by the learning execution unit 18c, with a corresponding base value and judges the generalization ability of the provisional neural network based on a predetermined standard. More specifically, the provisional generalization ability judgement unit 17a* provisionally changes the program that realizes the neural network NN of the NN estimation unit 11 according to the new connection condition obtained by the learning execution unit 18c to obtain the provisional neural network. Within a fixed generalization ability judgement period, the provisional generalization ability judgement unit 17a* calculates an average for a predetermined number of differences between air/fuel ratios (A/FNN) estimated by the provisional neural network and corresponding base values. If the average is below a predetermined set value, the generalization ability for the learning target field is judged as satisfactory. If, on the other hand, the average is equal to or more than the predetermined value, the generalization ability for the learning target field is judged as poor. Here, the predetermined number of differences is 100 differences obtained starting from the point when the neural network NN is provisionally renewed, while the predetermined value is 0.3 same as in the third embodiment. Note here that the total of 100 differences may instead be compared with a predetermined value (30) to judge the generalization ability of the provisional neural network.

<Relearning Unit>

The only difference of the relearning unit 17c of the fifth embodiment with the fourth embodiment lies in that the relearning unit 17c has the learning unit 18 perform the relearning for the field where generalization ability is judged as poor (relearning target field) by the provisional generalization ability judgement unit 17a*. That is to say, the relearning unit 17c has the learning data generation unit 18a read input data sets belonging to the relearning target field ad corresponding base values from the estimation data storage unit 15 to generate learning data sets, which are then stored into the learning data storage unit 18b. The relearning unit 17c then has the learning execution unit 18c perform the relearning on the provisional neural network using the learning data sets. Note that this relearning is performed under a condition different from the previous learning as in the fourth embodiment.

<NN Renewal Unit>

When the generalization ability for all learning target fields is judged as satisfactory by the provisional generalization ability judgement unit 17a*, the NN renewal unit 20a renews the neural network NN in the NN estimation unit 11 based on the new connection condition obtained by the learning execution unit 18c.

<Online Learning Operation>

Figure 24:
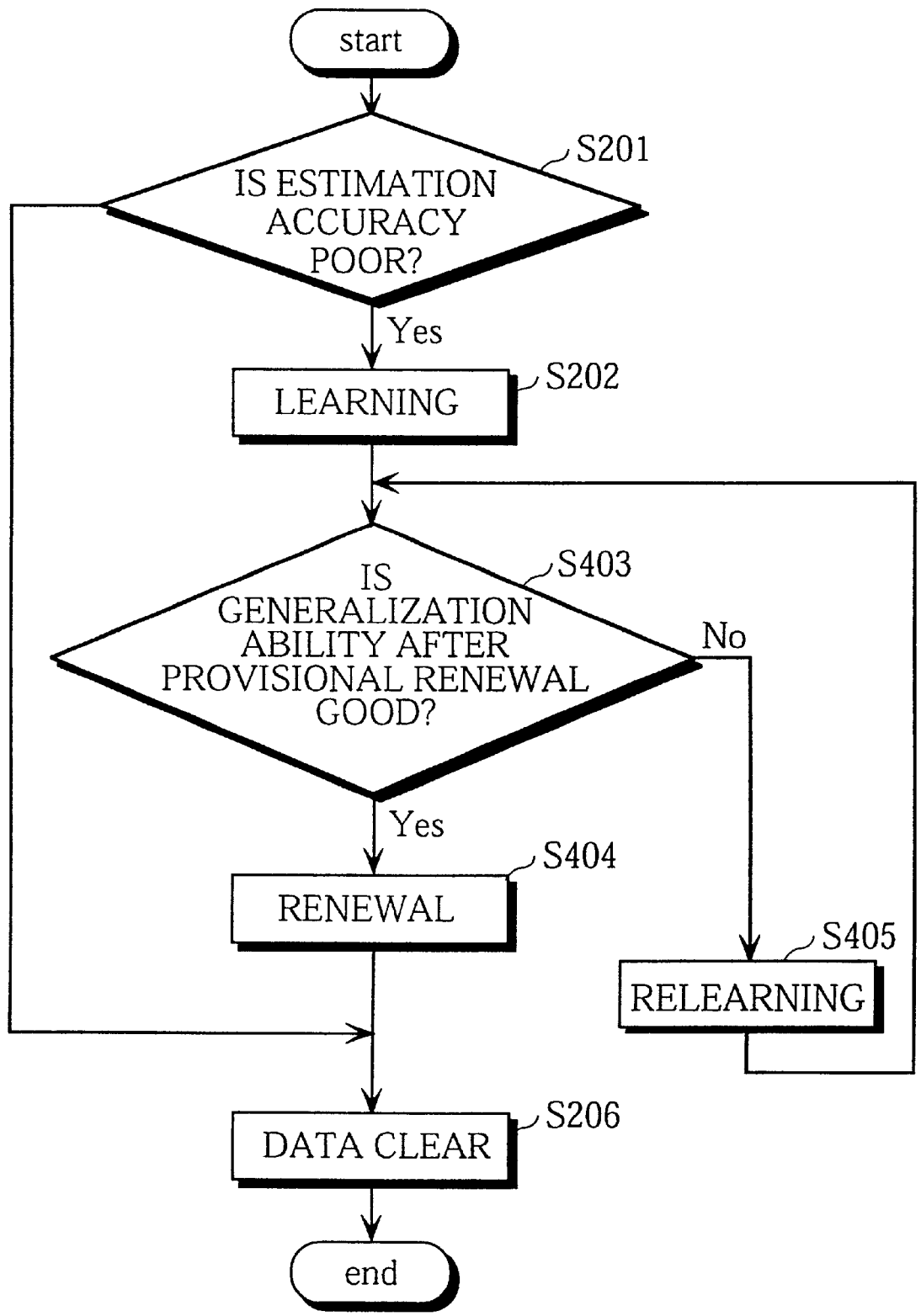
FIG. 24 is a flowchart showing the online learning operation of the air/fuel ratio control apparatus of the fifth embodiment.
Figure 25:
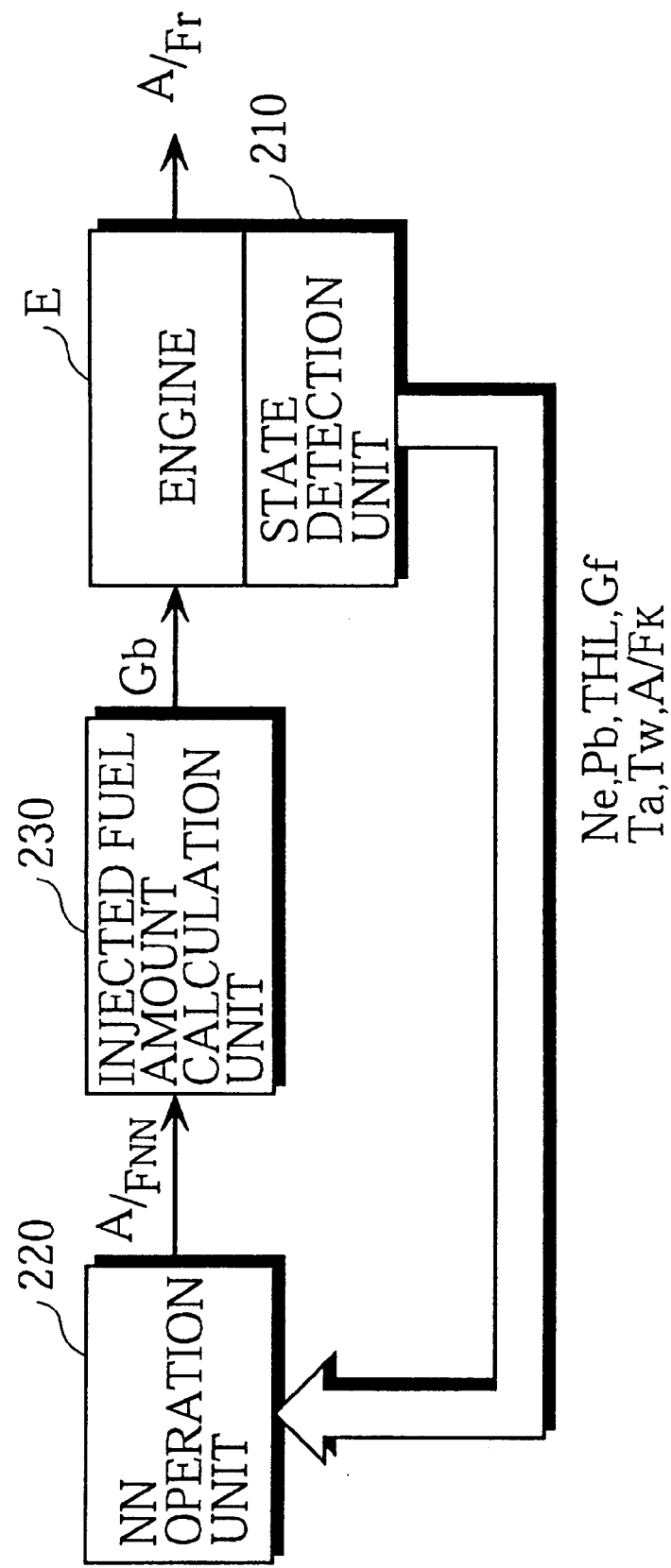
FIG. 25 is a functional block diagram showing the air/fuel ratio control apparatus using the conventional neural network.
Figure 26:
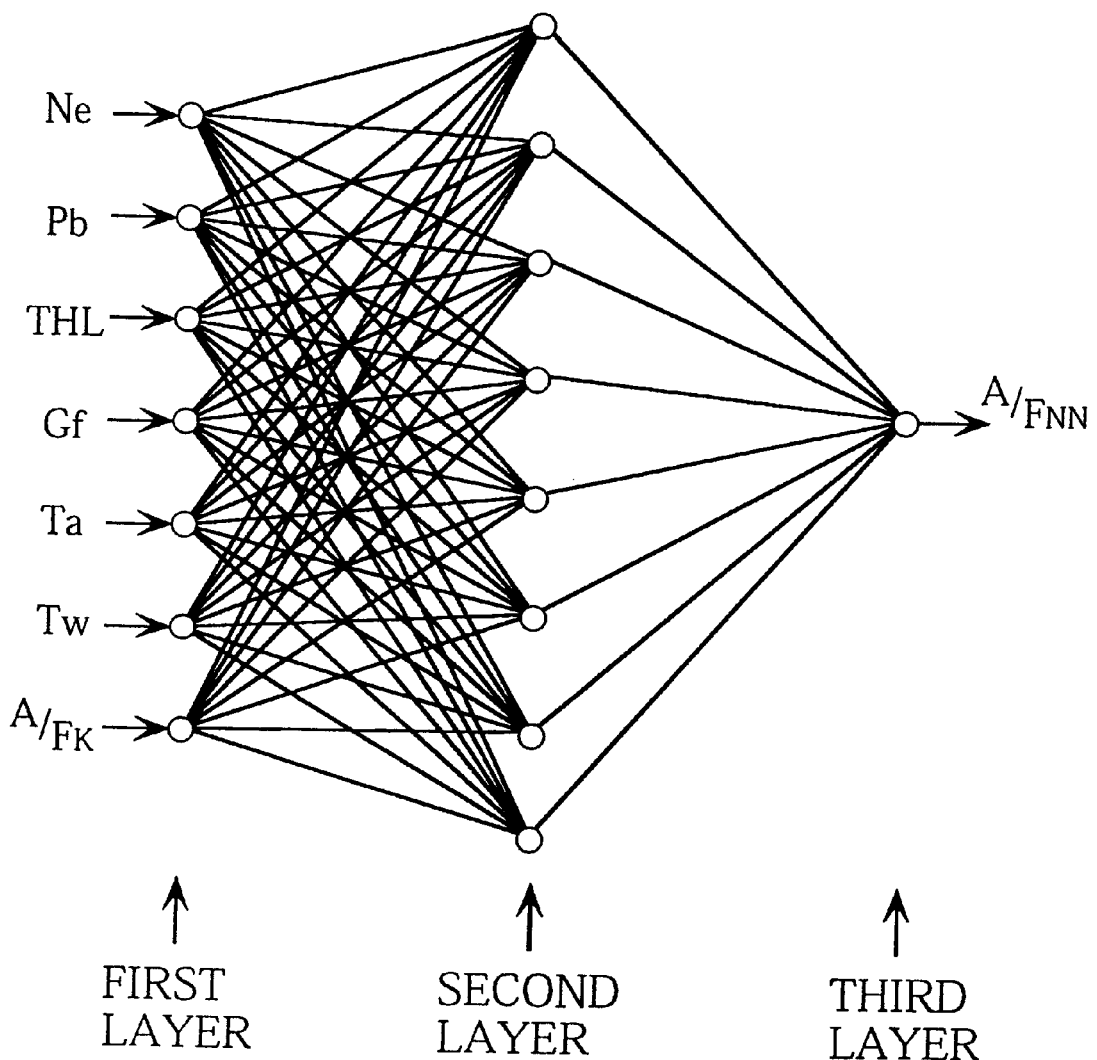
FIG. 26 shows an example of the construction of the conventional neural network used in the air/fuel ratio control apparatus shown in FIG. 25.
Figure 27:
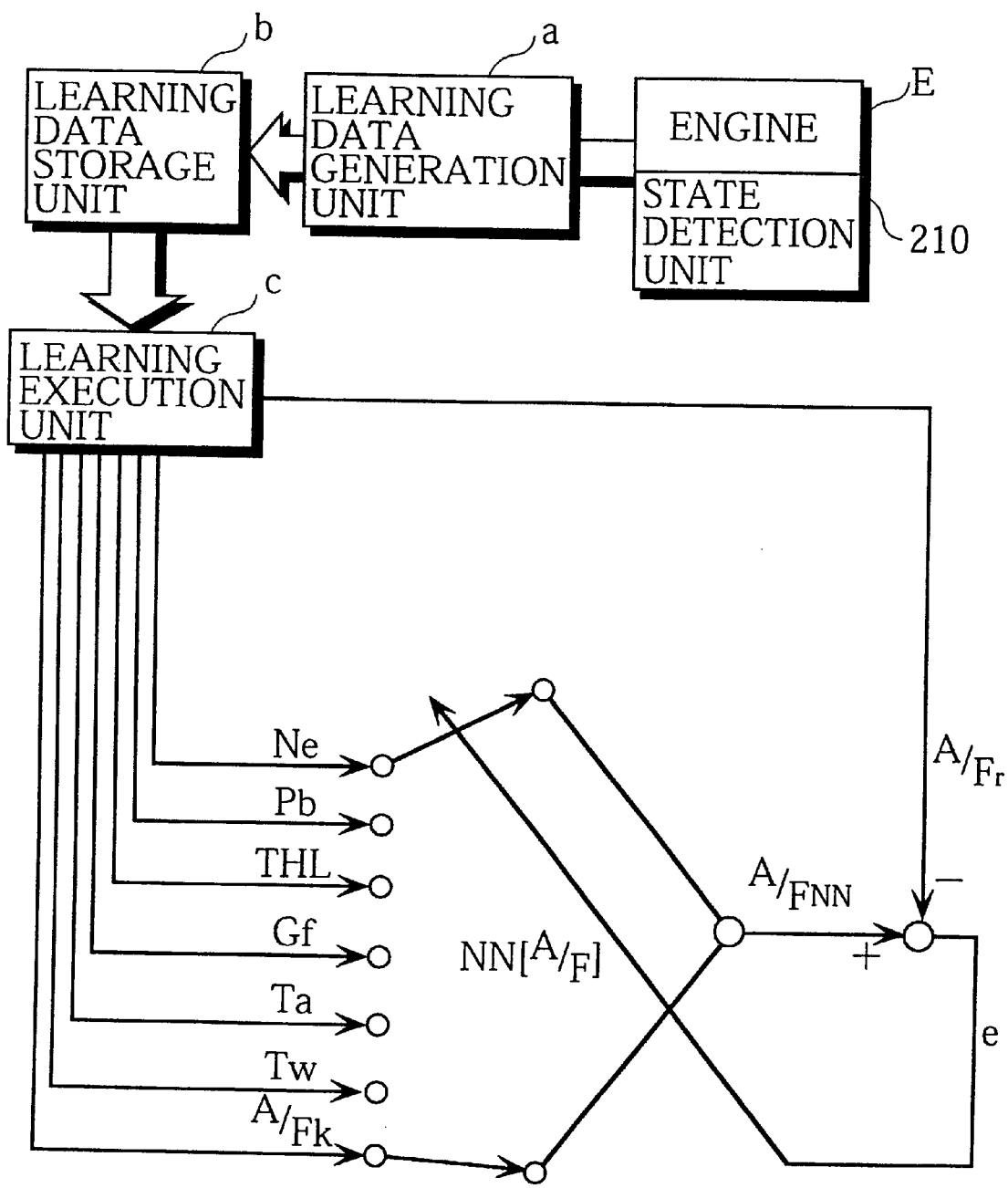
FIG. 27 shows a model example of the learning process for the conventional neural network.

The following is an explanation of the online learning operation of the air/fuel ratio control apparatus with the above construction. FIG. 24 is a flowchart showing the online learning operation of the fifth embodiment. Steps S201 and S202 are the same as the third embodiment shown in FIG. 19 and are not explained here.

On obtaining a new connection condition for the learning target field as a result of the learning in step S202, the provisional generalization ability judgement unit 17a* acquires the provisional neural network by provisionally renewing the program that realizes the neural network NN of the NN estimation unit 11 based on the new connection condition. The provisional generalization ability judgement unit 17a* then successively calculates a difference between an air/fuel ratio (A/FNN) estimated by the provisional neural network and a corresponding base value (A/Fr) until the number of differences reaches 100. The provisional generalization ability judgement unit 17a* judges whether the average for the 100 differences is below the predetermined value (0.3) (Step S403). Here, the total for the 100 differences may instead be compared with the predetermined value (30).

If the generalization ability of the provisional neural network is judged as satisfactory, the NN renewal unit 20a renews the neural network NN in the NN estimation unit 11 (Step S404).

If, on the other hand, the generalization ability is judged as poor, the relearning unit 17c has the learning unit 18 perform the relearning on the provisional neural network corresponding to the relearning target field and obtain a newer connection condition (Step S405).

On obtaining the newer connection condition, the operation returns to Step S403 where the provisional generalization ability judgement unit 17a* acquires a newer provisional neural network by renewing the provisional neural network based on the newer connection condition. Next, the generalization ability of the new provisional neural network is judged, and the relearning is performed on the new provisional neural network when the generalization ability for the relearning target field is judged as poor (Step S405). Thus, Steps S403 and S405 are repeated until the generalization ability for all relearning target fields is judged as satisfactory. Then, the NN renewal unit 20a actually renews the neural network NN in the NN estimation unit 11 using the newest connection condition obtained by the learning execution unit 18c (Step S404). Finally, learning data sets in the learning data storage unit 18b are cleared and the operation is complete as in the third embodiment (Step S206).

With the above operation, the neural network NN in the NN estimation unit 11 is not renewed until it becomes clear that the renewal will not result in the poor generalization ability. By doing so, the decrease in air/fuel ratio control accuracy caused by learning mistake can be avoided when the state of the engine E is outside of the range covered by the learning data sets. Thus, the online learning can be safely executed.

While the air/fuel ratio of the engine E is the control target in the above embodiments, the NN operation unit 1 of the present invention can also be applied to other control targets so long as it is possible to detect parameters relating to a parameter that is extremely nonlinear and that is to be estimated using the neural network. Also, the NN operation unit 1 of the present invention can be used not only in control apparatuses but any apparatuses for estimating an output from a plurality of inputs when it is difficult to analyze the input/output cause-effect relation.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An output parameter estimation apparatus for estimating an output parameter value from an input data set that is composed of a plurality of input parameter values, wherein the input data set is obtained whenever time series input data is sampled, the output parameter estimation apparatus comprising:

field division information storage means for storing field division information showing how an n-dimensional space is divided into a plurality of fields, "n" being an integer no less than 1, and the n-dimensional space having n axes that correspond to n input parameters;

field determination means for determining a field, among the plurality of fields, to which the input data set belongs, according to the field division information;

fuzzy operation means for calculating a fitness degree of the input data set in each of the determined field and a field adjacent to the determined field by using a fuzzy inference rule for n input parameter values, among the plurality of input parameter values, that correspond to the n input parameters in the n-dimensional space;

a neural network, including an input layer, an output layer, and at least one hidden layer between the input layer and the output layer, the input layer, the hidden layer, and the output layer being connected according to a connection condition corresponding to each of the plurality of fields, the connection conditions having been set as a result of learning performed using learning data;

route selection means for selecting routes between an introduction layer for the neural network and the input layer of the neural network, based on the fitness degrees obtained by the fuzzy operation means; and input data introduction means for inputting, after the routes are selected by the route selection means, the input data set into the input layer of the neural network via the introduction layer and the selected routes, wherein, after being inputted in the input layer, the input data set is transferred to the output layer via the hidden layer in the connection condition corresponding to the determined field, and as a result the estimated output parameter value is outputted from the output layer.

2. The output parameter estimation apparatus of claim 1, wherein the fuzzy operation means obtains the fitness degree of the input data set in each of the determined field and the adjacent field based on membership functions corresponding to each of the n input parameters, and obtains a centroid for the input data set according to the obtained fitness degrees, based on membership functions that show the determined field and the adjacent field.

3. The output parameter estimation apparatus of claim 2, wherein the fuzzy operation means obtains the centroid using a min-max calculation method.

4. The output parameter estimation apparatus of claim 2, wherein the route selection means selects the routes between the introduction layer and the input layer in accordance with a proximity of the centroid to the adjacent field.

5. The output parameter estimation apparatus of claim 4, wherein the input data set is composed of a plurality of physical parameter values that are detected in an engine, an intake system, and an exhaust system while the engine is being used, wherein the output parameter value is an air/fuel ratio that is estimated as an actual air/fuel ratio in the engine, the actual air/fuel ratio being unable to be detected by an air/fuel ratio sensor installed in the exhaust system, wherein the neural network is a hierarchical neural network where the plurality of physical parameter values are inputted in the input layer and the estimated air/fuel ratio is outputted from the output layer, and wherein the field division information storage means stores information showing the plurality of fields that are generated by dividing each of at least two physical parameters that include an engine RPM and an intake air pressure into three ranges that are a low-speed range, a medium-speed range, and a high-speed range.

6. The output parameter estimation apparatus of claim 2, wherein the route selection means changes weights respectively assigned to the routes between the introduction layer and the input layer according to a proximity of the centroid to the adjacent field.

7. The output parameter estimation apparatus of claim 1, wherein the input data set is composed of a plurality of physical parameter values that are detected in an engine, an intake system, and an exhaust system while the engine is being used, wherein the output parameter value is an air/fuel ratio that is estimated as an actual air/fuel ratio in the engine, the actual air/fuel ratio being unable to be detected by an air/fuel ratio sensor installed in the exhaust system, wherein the neural network is a hierarchical neural network where the plurality of physical parameter values are inputted in the input layer and the estimated air/fuel ratio is outputted from the output layer, and wherein the field division information storage means stores information showing the plurality of fields that are generated by dividing each of at least two physical parameters that include an engine RPM and an intake air pressure into three ranges that are a low-speed range, a medium-speed range, and a high-speed range.

8. An output parameter estimation apparatus for estimating an output parameter value from an input data set that is composed of a plurality of input parameter values, wherein the input data set is obtained whenever time series input data is sampled, the output parameter estimation apparatus comprising:

field division information storage means for storing field division information showing how an n-dimensional space is divided into a plurality of fields, "n" being an integer no less than 1, and the n-dimensional space having n axes that correspond to n input parameters;

field determination means for determining a field, among the plurality of fields, to which the input data set belongs, according to the field division information;

a neural network, including an input layer, an output layer, and at least one hidden layer between the input layer and the output layer, the input layer, the hidden layer, and the output layer being connected according to a connection condition corresponding to each of the plurality of fields, the connection conditions having been set as a result of learning performed using learning data sets;

route selection means for selecting routes between an introduction layer for the neural network and the input layer of the neural network in accordance with the field determined by the field determination means;

input data introduction means for inputting, after the routes are selected by the route selection means, the input data set into the input layer of the neural network via the introduction layer and the selected routes, wherein, after being inputted in the input layer, the input data set is transferred to the output layer via the hidden layer in the connection condition corresponding to the determined field, and as a result the estimated output parameter value is outputted from the output layer;

estimation accuracy judgement means for comparing, each time an input data set obtained by sampling the time series input data is inputted in the input layer by the input data introduction means, an estimated output parameter value outputted from the output layer with a base value corresponding to the estimated output parameter value in order to judge an estimation accuracy of the neural network in a connection condition corresponding to each field;

first relearning means for performing learning, when the estimation accuracy is judged as poor for at least one field, on a connection condition of the neural network corresponding to the field using learning data sets in order to obtain a new connection condition, each learning data set being composed of an input data set that belongs to the field and a base value corresponding to the input data set, and the learning being performed after the introduction layer and the input layer are connected by the routes selected by the route selection means; and neural network renewal means for renewing the connection condition of the neural network corresponding to the field based on the new connection condition.

9. The output parameter estimation apparatus of claim 8, wherein the estimation accuracy judgement means includes base value acquisition means for acquiring an accurately estimated output parameter value as the base value corresponding to the input data set from outside.

10. The output parameter estimation apparatus of claim 9, wherein the estimation accuracy judgement means judges the estimation accuracy for each field by calculating one of an average value and a distribution value for a plurality of difference values obtained within an estimation accuracy judgement period, the plurality of difference values each being a difference between an output parameter value and a corresponding base value.

11. The output parameter estimation apparatus of claim 9, wherein the estimation accuracy judgement means judges the estimation accuracy for each field by calculating a total value for a plurality of difference values obtained within an estimation accuracy judgement period, the plurality of difference values each being a difference between an output parameter value and a corresponding base value.

12. The output parameter estimation apparatus of claim 9, wherein the first relearning means includes:

learning data generation means for generating each of the learning data sets from the input data set that belongs to the field and the corresponding base value;

learning data storage means for storing the generated learning data sets corresponding to the field; and learning execution means for performing the learning on the connection condition of the neural network corresponding to the field using the stored learning data sets to obtain the new connection condition.

13. The output parameter estimation apparatus of claim 8, further comprising;

initial connection condition storage means for storing an initial connection condition of the neural network for each field; and initial connection condition return means for returning the neural network to the initial connection condition stored in the initial connection condition storage means.

14. The output parameter estimation apparatus of claim 8, further comprising:

generalization ability judgement means for comparing, after the connection condition of the neural network is renewed by the neural network renewal means, output parameter values, which are estimated by the neural network respectively from input data sets that belong to the field, with corresponding base values to judge a generalization ability of the neural network in the new connection condition; and renewal cancel means for canceling, when the generalization ability is judged as poor, the new connection condition of the neural network corresponding to the field.

15. The output parameter estimation apparatus of claim 8, further comprising:

generalization ability judgement means for comparing, after the connection condition of the neural network is renewed by the neural network renewal means, output parameter values, which are estimated by the neural network respectively from input data sets that belong to the field, with corresponding base values to judge a generalization ability of the neural network in the new connection condition; and second relearning means for generating, when the generalization ability is judged as poor, learning data sets using input data sets that belong to the field and corresponding base values, and for performing relearning on the new connection condition of the neural network corresponding to the field in order to obtain a newer connection condition, wherein when the newer connection condition is obtained by the second relearning means, the neural network renewal means further renews the new connection condition of the neural network corresponding to the field based on the newer connection condition.

16. The output parameter estimation apparatus of claim 8, further comprising provisional generalization ability judgement means for obtaining a provisional neural network by provisionally renewing the connection condition of the neural network corresponding to the field based on the new connection condition obtained by the first relearning means, and for comparing output parameter values, which are estimated by the provisional neural network from input data sets that belong to the field, with corresponding base values to judge a generalization ability of the provisional neural network in the new connection condition, wherein when the generalization ability of the provisional neural network is judged as satisfactory, the neural network renewal means renews the connection condition of the neural network corresponding to the field based on the new connection condition obtained by the first relearning means.

* * * * *